(12) United States Patent
Okawa

(10) Patent No.: US 7,689,814 B2
(45) Date of Patent: Mar. 30, 2010

(54) METHODS AND APPARATUS FOR DISABLING ERROR COUNTERMEASURES IN A PROCESSING SYSTEM

(75) Inventor: Yasukichi Okawa, Kawasaki (JP)

(73) Assignee: Sony Computer Entertainment Inc. (JP)

(*) Notice: Subject to any disclaimer, the term of this patent is extended or adjusted under 35 U.S.C. 154(b) by 1449 days.

(21) Appl. No.: 11/016,797

(22) Filed: Dec. 20, 2004

(65) Prior Publication Data
US 2006/0143509 A1 Jun. 29, 2006

(51) Int. Cl.
G06F 9/00 (2006.01)

(52) U.S. Cl. ..................................... 712/227
(58) Field of Classification Search ................. 712/227; 714/15, 16, 18, 19, 708, 757, 766
See application file for complete search history.

(56) References Cited

U.S. PATENT DOCUMENTS

| 5,535,226 | A * | 7/1996 | Drake et al. ................. 714/773 |
| 5,812,799 | A * | 9/1998 | Zuravleff et al. .............. 710/52 |
| 5,978,953 | A * | 11/1999 | Olarig ........................ 714/768 |
| 6,209,112 | B1 * | 3/2001 | Stevenson .................... 714/752 |
| 6,748,443 | B1 * | 6/2004 | Parry et al. .................. 709/232 |
| 6,829,684 | B2 * | 12/2004 | Doing et al. ................. 711/152 |
| 6,854,048 | B1 * | 2/2005 | Dice .......................... 712/216 |
| 6,941,493 | B2 * | 9/2005 | Phelps ........................ 714/53 |
| 6,983,414 | B1 * | 1/2006 | Duschatko et al. .......... 714/782 |
| 7,162,676 | B2 * | 1/2007 | Coleman et al. ............. 714/752 |
| 7,174,385 | B2 * | 2/2007 | Li .............................. 709/231 |
| 2001/0023436 | A1 * | 9/2001 | Srinivasan et al. .......... 709/219 |
| 2002/0029331 | A1 * | 3/2002 | Toyoyama et al. ............. 712/36 |
| 2002/0107594 | A1 * | 8/2002 | Taylor et al. .................. 700/94 |
| 2003/0189943 | A1 * | 10/2003 | Gorti et al. .................. 370/412 |
| 2004/0114516 | A1 * | 6/2004 | Iwata et al. .............. 370/230.1 |

FOREIGN PATENT DOCUMENTS

| JP | 60-227523 | 11/1985 |
| JP | 61-058041 | 3/1986 |
| JP | 62145330 | 6/1987 |
| JP | 62243438 | 10/1987 |
| JP | 05-204772 | 8/1993 |
| JP | 2002140874 | 5/2002 |

OTHER PUBLICATIONS

Song, L etal, 10- and 40- Gb/s Forward Error Correction Devices for Optical Communications, 2002, IEEE, pp. 1565-1573.*
Office Action from corresponding Japanese Application No. 2005-366118, dated Oct. 21, 2008. (translation only).
Office Action from corresponding Japanese Application No. 2005-366118, dated Mar. 3, 2009.

* cited by examiner

Primary Examiner—Eric Coleman
(74) Attorney, Agent, or Firm—Lerner, David, Littenberg, Krumholz & Mentlik, LLP

(57) ABSTRACT

Methods and apparatus are provided for disabling error handling countermeasures in various processing contexts, such as by monitoring whether a given processing context requires error handling countermeasures; and disabling any recoverable error correction countermeasures when such countermeasures are not required.

55 Claims, 13 Drawing Sheets

METHODS AND APPARATUS FOR DISABLING ERROR COUNTERMEASURES IN A PROCESSING SYSTEM

BACKGROUND OF THE INVENTION

The present invention relates to error handling in computing systems, for example methods and apparatus for disabling error countermeasures in a processing system.

Real-time, multimedia applications are becoming increasingly important. These applications require extremely fast processing speeds, such as many thousands of megabits of data per second. Such applications may be executed on single processing units, which are capable of fast processing speeds, as well as multi-processor architectures, which generally exhibit even faster processing speeds. Indeed, in multi-processor systems, a plurality of sub-processors can operate in parallel (or at least in concert) to achieve desired processing results.

The types of computers and computing devices that may be used to execute real-time, multimedia applications are extensive. In addition to personal computers (PCs) and servers, these computing devices include cellular telephones, mobile computers, gaming consoles, personal digital assistants (PDAs), set top boxes, digital televisions and many others.

A design concern in many processing systems is how to manage a processing error. Indeed, a processing error could affect the overall performance of the processing system and adversely impact the real-time, multimedia experience of a user. This is particularly true in a multi-processor system when the result of one sub-processing unit is to be used by other sub-processing units in order to achieve a desired result.

Hard processor errors, such as error correction code (ECC) errors, parity errors, processor hang-ups, etc., may be characterized as fatal errors or recoverable errors. Fatal errors may occur due to operating system errors, kernel errors, etc., while recoverable errors generally do not involve operating system errors or kernel errors. In accordance with conventional techniques, when a recoverable error occurs, some form of error recovery technique is employed, for example, re-booting the processing system (or re-booting a sub-processing unit in a multi-processing system) and re-executing the processor tasks from the beginning.

Under some circumstances, executing an error correction process can do more harm than good. For example, when an application program involves the processing of streaming video in a multi-media context, the execution of an error correction process may unnecessarily delay the execution of the application program. Indeed, the human eye tends to integrate video images from one frame to the next, and will often not perceive a data error in a particular frame of a streaming video clip. Thus, it may be beneficial to disable any error correction countermeasures in the streaming video context because unnecessary re-boot and/or re-execution of the given processor tasks may be avoided.

Another context in which it may be desirable to disable an error correction process is when such error countermeasures would be duplicative. For example, reference is made to co-pending, commonly assigned, U.S. patent application Ser. No. 10/849,623, filed May 19, 2004, entitled METHODS AND APPARATUS FOR HANDLING PROCESSING ERRORS IN A MULTI-PROCESSOR SYSTEM, the entire disclosure of which is hereby incorporated by reference. This patent application discloses a hardware-implemented error handling countermeasure in a multi-processing system environment. The system calls for moving the processor tasks from one sub-processing unit (in which an error has occurred) to another sub-processing unit that is capable of handling those tasks. It may be desirable to disable this technique of handling processing errors when other countermeasures are in place, such as software countermeasures, etc.

Therefore, there is a need in the art for new methods and apparatus for achieving efficient data processing that reduces any adverse affects of handling processing errors by at least temporarily disabling any error countermeasures when possible.

SUMMARY OF THE INVENTION

In accordance with an embodiment of the present invention, a method of processing instructions and data is provided. The method comprises determining whether an error correction countermeasure should be used in association with an instruction or data, and disabling the use of the error correction countermeasure based on the determination.

In one example the instruction is a load instruction or a store instruction. In another example the instruction is a DMA data transfer instruction.

In an alternative, the method further comprises associating an attribute with the instruction or the data. Here, the attribute indicates whether the error correction countermeasure should be used when executing the instruction or the data. In this case, the method preferably further comprises propagating the attribute along with the instruction or the data to a selected component if it is determined that the error correction countermeasure should not be used and the error correction countermeasure is disabled.

In another alternative, the determination of whether the error correction countermeasure should be used comprises checking whether an address specified by the instruction or the data is within a range of addresses. In this case, the range of addresses may be specified by one or more registers.

In a further alternative, the determination of whether the error correction countermeasure should be used is performed in a memory management unit by checking an attribute table while performing address translation. In yet another alternative, the instruction or the data preferably has an attribute indicating whether the error correction countermeasure should be used when executing the instruction or processing the data. In this case, the attribute may be included in a transaction packet for transmitting the instruction or the data to a device. In another alternative, determining whether the error correction countermeasure should be used includes identifying multiple error correction countermeasures and selecting one or more of the multiple error correction countermeasures for disabling.

In accordance with another embodiment of the present invention, a processor for processing instructions and data is provided. The processor comprises means for analyzing an instruction or the data to determine whether an error correction countermeasure should be used in association with the instruction or the data, and means for disabling the error correction countermeasure based upon the determination.

In one alternative the instruction is a data transfer operation. In another alternative, an attribute is preferably associated with the instruction or the data. Here, the attribute indicates whether the error correction countermeasure should be used when executing the instruction or the data. In a further alternative, the processor further comprises one or more registers specifying a range of addresses. At least a portion of the address range is utilized when the error correction countermeasure is disabled. In yet another alternative, the processor further comprises a memory management unit that checks an attribute table while performing address translation to determine whether the error correction countermeasure should be used with the instruction or the data.

In accordance with a further embodiment of the present invention, a system is provided that is capable of processing error correction countermeasures associated with instructions and data. The system comprises a processor and a device. The processor includes means for analyzing a selected instruction or selected data to determine whether any error correction countermeasures should be used in association with the selected instruction or the selected data, means for enabling or disabling at least one of the error correction countermeasures in accordance with the determination, if the means for determining determines that the selected instruction or the selected data should be executed by the processor, and means for propagating the selected instruction or the selected data. The device is operable to receive the selected instruction or the selected data from the propagating means.

In one alternative the device is a cache memory. In another alternative the device is a storage buffer. In a further alternative the device is a local memory internal to the processor. In yet another alternative the device is an I/O device.

In another alternative, the system further comprises an attribute indicating whether one or more of the error correction countermeasures should be used. In this case, the propagating means preferably attaches the attribute to a transaction packet containing the selected instruction or the selected data for transmission to the device.

In a further alternative, the analyzing means checks whether an address associated with the selected instruction or the selected data is within a range of addresses. In yet another alternative, the analyzing means may include at least one register. In another alternative, the analyzing means preferably includes a memory management unit that checks an attribute table while performing address translation.

In accordance with yet another embodiment of the present invention, a method of processing instructions is provided. The method comprises obtaining an address associated with an instruction issued by a processor, determining whether the address is within a predetermined range of addresses in a memory, and disabling any error correction countermeasures when the address is within the predetermined range.

In an alternative, the instruction issued by the processor comprises data transfer operation. In another alternative, the determination step includes accessing information from a hardware register that is indicative of the predetermined range. In this case, the information preferably includes at least one of a starting address of the predetermined range, a length of the predetermined range, and an ending address of the predetermined range.

In accordance with another embodiment of the present invention, a method of processing instructions is provided. The method comprises obtaining an address from a data transfer command issued by a processor, accessing an address translation table to determine a physical address in a memory that is associated with the address of the data transfer command, accessing an attribute table to obtain an error correction attribute that is associated with at least one of the address of the data transfer command and the physical address, and disabling at least one error correction countermeasure when the associated attribute so indicates.

In accordance with a further embodiment, a storage medium is provided to store a program for use by a processor. The program causes the processor to determine whether an error correction countermeasure should be used in association with an instruction or data, and to disable the use of the error correction countermeasure based on the determination.

In one alternative, the program further causes the processor to associate an attribute with the instruction or the data. Here, the attribute indicates whether the error correction countermeasure should be used when executing the instruction or the data. In another alternative, the program further causes the processor to propagate the attribute along with the instruction or the data to a selected component if it is determined that the error correction countermeasure should not be used and the error correction countermeasure is disabled. In this case, the attribute is preferably attached to a transaction packet transmitted in association with the instruction or the data.

In accordance with yet another embodiment, a processing system for processing instructions is provided. The processing system comprises a plurality of processing devices operable to issue instructions, execute instructions, or both issue and execute instructions. A first one of the processing devices comprises a processing unit or a sub-processing unit. The first processing device is programmed to determine whether an error correction countermeasure should be used in association with a selected instruction, and to disable the use of the error correction countermeasure based on the determination.

In one alternative, the first processing device issues the selected instruction, and the selected instruction is a data transfer operation. In another alternative, the first processing device is integrated with a processing element that comprises the processing unit and one or more sub-processing units connected via a bus. Here, the first processing device preferably comprises the processing element. An attribute is preferably associated with the selected instruction. The attribute indicates whether the error correction countermeasure should not be used. The selected instruction is propagated along with the attribute between the sub-processing element and the processing unit via the bus. In this case, the attribute may be attached to a transaction packet that includes the selected instruction.

In a further alternative, the first processing device determines whether the error correction countermeasure should be used by checking whether an address associated with the selected instruction is within a selected range of addresses. In yet another alternative, the system further comprises a memory management unit connected to the first processing device. The memory management unit includes an attribute table. The determination of whether the error correction countermeasure should be used includes examining the attribute table while performing address translation.

In another alternative, a second one of the processing devices comprises a processing unit, the first processing device comprises a first sub-processing unit, and at least a third one of the processing devices comprises a second sub-processing unit. The first and second sub-processing units are connected to the processing unit by a bus. At least the first sub-processing unit is connected to a memory.

In accordance with another embodiment of the present invention, a processor for processing instructions is provided. The processor comprises a processing element including a bus, a processing unit and a plurality of sub-processing units connected to the processing unit by the bus. The processor is connectable to a memory and is operable to issue instructions, execute instructions, or both issue and execute instructions. The processor is programmed to determine whether an error correction countermeasure should be used in association with a selected instruction, and to disable the use of the error correction countermeasure based on the determination.

In one alternative, the processing element, the processing unit or one of the sub-processing units issues the selected instruction, and the selected instruction is a data transfer operation. In another alternative, an attribute is associated with the selected instruction. The attribute indicates whether the error correction countermeasure should not be used. The selected instruction and the attribute are propagated by the processor as part of a transaction packet. In yet another alternative, the processor determines whether the error correction countermeasure should be used by checking whether an address associated with the selected instruction is within a selected range of addresses. In a further alternative, the processor further comprises a memory management unit. The memory management unit including an attribute table. The determination of whether the error correction countermeasure should be used includes examining the attribute table while performing address translation.

In accordance with yet another embodiment, a computer processing system is provided, which comprises a user input device, a display interface for attachment of a display device, and a processor. The processor comprises one or more processing elements. At least one of the processing elements is programmed to issue instructions, to execute instructions, to determine whether an error correction countermeasure should be used in association with a selected instruction, and to disable the use of the error correction countermeasure based on the determination.

In accordance with another embodiment, a computer network is provided, which comprises a plurality of computer processing systems connected to one another via a communications network. Each of the computer processing systems comprises a user input device, a display interface for attachment of a display device, and a processor. The processor comprises one or more processing elements. At least one of the processing elements is programmed to issue instructions, to execute instructions, to determine whether an error correction countermeasure should be used in association with a selected instruction, and to disable the use of the error correction countermeasure based on the determination. In an alternative, at least one of the computer processing systems comprises a gaming unit capable of processing multimedia gaming applications.

In accordance with a further embodiment, a system comprising a plurality of processors configured to execute processor tasks is provided. The system includes an execution unit for managing a reallocation of the processor tasks among the plurality of processors, and a detecting unit for detecting an attribute of a selected one of the processor tasks. The execution unit reallocates the processor tasks depending upon the attribute of the selected processor task.

In one example the attribute is assigned based upon a data type. In another example the data type indicates whether data is real time data. In a further example the data type indicates whether data is streaming data. In yet another example the data type indicates whether a data error or defect is noticeable to a user. For example, it is possible that the user may hear a data error (e.g., a hiss, a popping noise or a skip) in stream of sound data.

In an alternative, the reallocation further depends upon detecting an error occurrence in one of the plurality of processors. In this case, the execution unit preferably reallocates the processor tasks by evaluating the attribute of the selected processor task prior to the detection of the error occurrence. In another alternative, each of the processors preferably includes a local memory. In a further alternative, each of the processors preferably comprises a plurality of processing devices. In this case, the plurality of processing devices may include a first type of processing device and a second type of processing device.

In accordance with yet another embodiment, a method of processing instructions is provided. The method comprises determining an initial allocation of processor tasks among multiple processors, detecting an attribute associated with a selected one of the processor tasks, and reallocating the processor tasks based upon the attribute of the selected processor task.

Other aspects, features, and advantages of the present invention will be apparent to one skilled in the art from the description herein taken in conjunction with the accompanying drawings.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION

Figure 1:
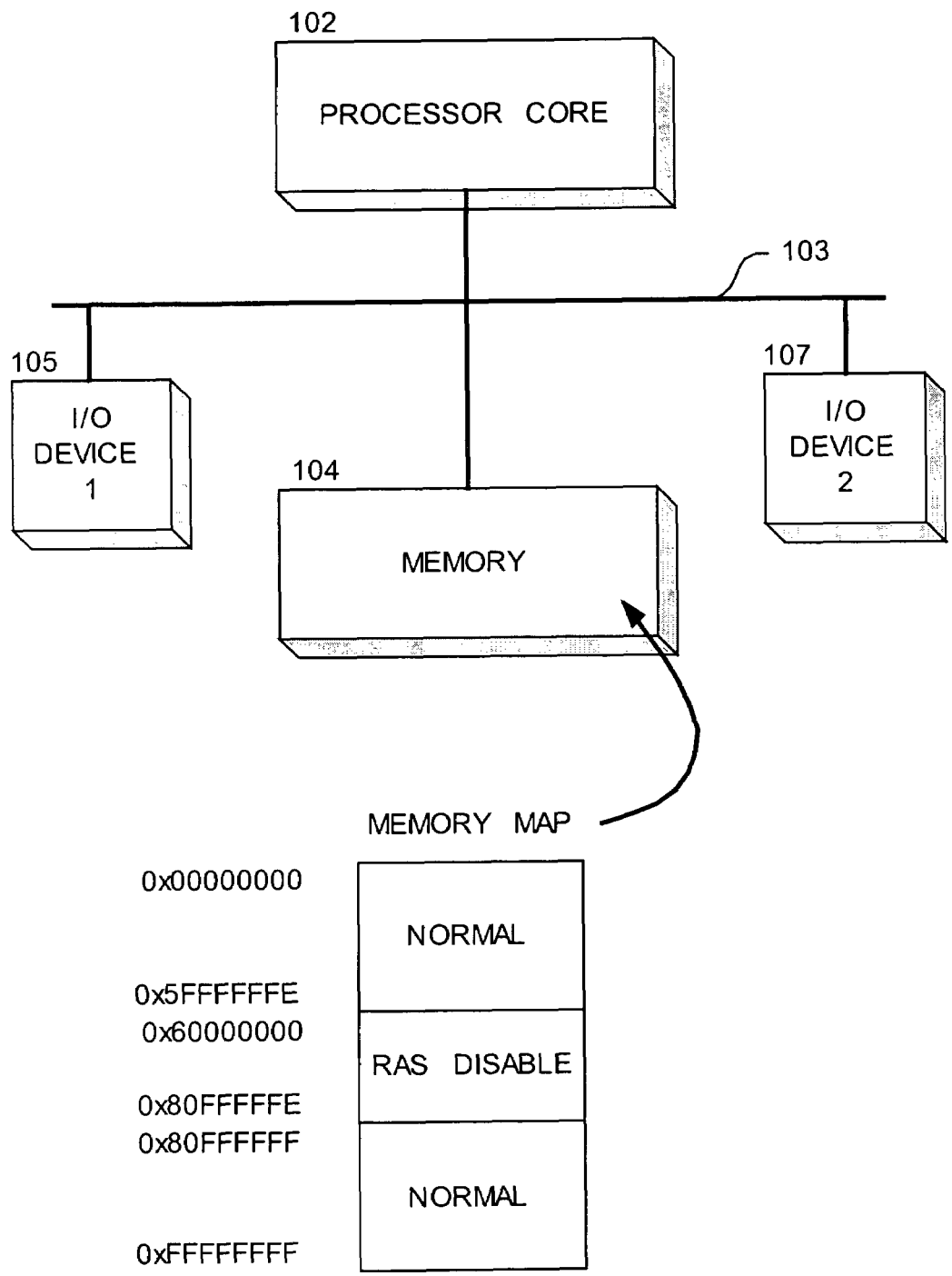
FIG. 1 is a block diagram illustrating the structure of a processing system in accordance with one or more aspects of the present invention.

Referring now to the drawings, wherein like numerals indicate like elements, there is shown in FIG. 1 a block diagram of a processing system 100 including a processor core 102 and a memory 104 connected via a bus 103. One or more I/O devices, such as I/O devices 105 and 107, may also be in communication with the processor core 102 and/or the memory 104 through the bus 103. In accordance with one or more aspects of the present invention, the processor core 102 may be a stand-alone processor or may be but one sub-processor of a larger multi-processing system. The processor core 102 is preferably capable of at least partially executing an error handling procedure. Such error handling procedure may be an error correction code (ECC) procedure, a parity checking procedure, a hardware error handling procedure as described in the background section of this description, a re-boot/re-execute procedure, etc.

In general, various aspects of the present invention are directed to monitoring whether a given context in which the processor core 102 is operating requires error handling countermeasures and/or whether or not to pass such error handling information to other parts of the computing system. For example, the processing system 100 may be processing a streaming video, in which some level of error may be tolerated. These aspects of the invention are preferably also directed to disabling any recoverable error correction countermeasures when such countermeasures are not required. Possible arrangements and mechanisms for disabling recoverable error correction countermeasures in accordance with the present invention are numerous, and several examples of preferred mechanisms are presented below.

Figure 2:
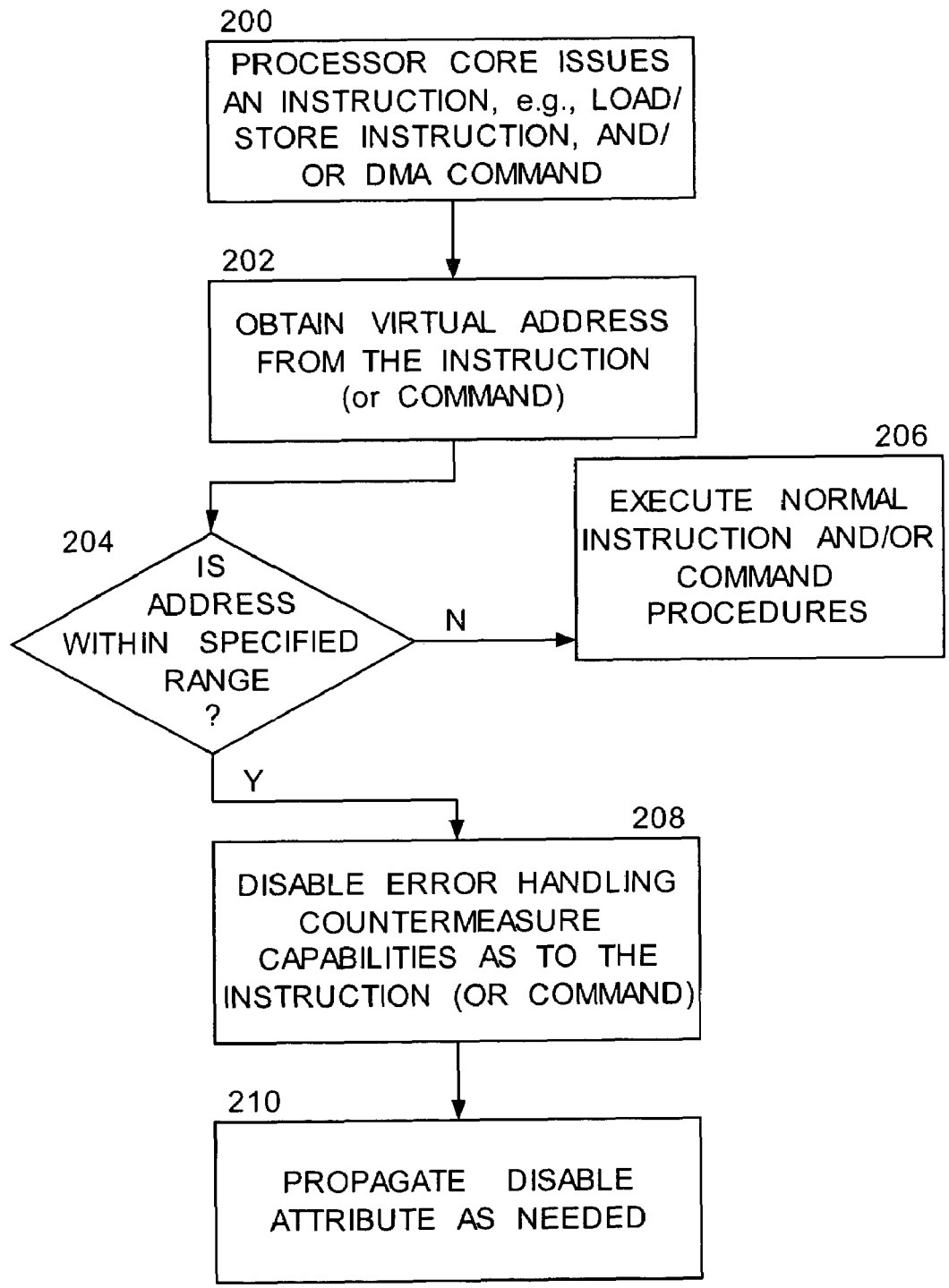
FIG. 2 is a flow diagram illustrating process steps that may be carried out by the processing system of FIG. 1 in accordance with one or more aspects of the present invention.

With reference to FIGS. 1 and 2, the memory 104 is preferably organized into bytes or lines or data, which are mapped by their address. In certain implementations, the memory 104 may be embedded in or otherwise integrated as part of the processor chip containing the processor core 102, as opposed to being a separate, external memory. For instance, the RAM 112 can be in a separate location on the chip or can be integrated with the processor core 102. The processor core 102 may issue any number of instructions that result in data storage into the memory 104 and/or data withdrawal from the memory 104. For example, the processor core 102 may issue a load instruction, which specifies an address in the memory 104 from which data is to be extracted for further processing. Alternatively, the processor core may issue a store instruction, which also specifies an address in which data is to be introduced and stored into the memory 104. Alternatively, in a direct memory access system, the processor core may issue a DMA command, which also specifies an address from which data should be extracted from the memory 104. In one embodiment, the load, store and/or DMA instructions may be processor specific, operating system specific, or otherwise non-standard instructions. For instance, many processors utilize special load and/or store instructions having special features. A processor may have a cache inhibited load/store instruction that does not retain-data in any cache of the system. Preferably, one type of special data transfer operation in accordance with an aspect of the present invention is a "load (or store) with RAS disable" instruction that does not activate any error recovery countermeasures. A conventional RAS system propagates error information until the instruction arrives at its intended destination, so that the receiving component can perform an appropriate action for managing corrupted data. In the case where a special data transfer operation is employed, error propagation is not used. Processor issued instructions are illustrated in FIG. 2 at action 200. While the specified instructions are contemplated by the invention, the present invention is not limited to the load/store instructions and/or the DMA command; indeed, any other processor issued instruction involving an address into the memory 104 or other storage device is contemplated.

While the above example has been discussed in relation to the memory 104, it should be understood that embodiments of the present invention may include interactions with other types of devices, such as I/O devices 105 and 107, either in addition to or without the use of the memory 104. In any case, the address portion of the instruction (or command), which may be a physical or a virtual address, is obtained or otherwise extracted from the instruction (action 202) such that it may be analyzed. In particular, at action 204 a determination is made as to whether the address is within a specified range, such as a predetermined range of addresses within the memory 104. For example, as shown in FIG. 1, the memory 104 may be partitioned into two or more sections, where one section within the predetermined range of addresses constitutes an area in the memory 104 in which error handling countermeasures will be disabled. In particular, the range of addresses between 0x00000000 and 0x5FFFFFFE may correspond with an area within the memory 104 in which error handling countermeasures will be enabled ("NORMAL"). The range of addresses from 0x60000000 and 0x80FFFFFE may specify an area in the memory 104 in which error handling countermeasures are disabled ("RAS DISABLE"). Finally, the range of addresses from 0x80FFFFFF and 0xFFFFFFFF may specify another area in the memory 104 in which error handling countermeasures are enabled ("NORMAL").

The determination at action 204 may involve the access of information from one or more hardware registers (not shown) that is indicative of the predetermined range. For example, the register may include a starting address of the predetermined range and a length of the predetermined range. Alternatively, the register or registers may include the starting address of the predetermined range and an ending address of the predetermined range. Finally, the register or registers may include the ending address of the predetermined range and the length of the predetermined range. In any case, such information provides the necessary information to determine the metes and bounds of the predetermined range of addresses within the memory 104 in which error handling countermeasures will be disabled.

By way of example, if the result of the determination at action 204 is negative, such that error handling countermeasures should be used, then the process flow preferably advances to action 206, where normal instruction (or command) procedures are carried out. For example, if the address were 0x0000FFFF, then such address would fall outside the predetermined range of 0x60000000 and 0x80FFFFFE, and the result of the determination at action 204 would be negative and processing would continue to action 206. On the other hand, if the address were 0x60000FFF, which is within the predetermined range, then the result of the determination at action 204 would be in the affirmative and the process flow would advance to action 208.

At action 208, the error handling countermeasure capabilities of the system 100 are disabled. Thus, the issuance of an instruction (or command), such as a data transfer operation to a specified address in the memory 104 causes the system 100 to disable the error handling countermeasure capabilities associated with such address, which may include acknowledging the error handling countermeasure but not acting on it. In this context, the address of the instruction (or command) includes an attribute indicative of whether the error handling countermeasure capabilities should be enabled or disabled. In this example, the attribute is associated with the address vis-à-vis the memory map of the memory 104.

The actions of FIG. 2 are preferably performed under hardware control in a processor. In alternative embodiments, a special purpose processor or ASIC with circuits designed to implement the functions specified in FIG. 2 can also be implemented.

In accordance with further aspects of the present invention, the attribute is preferably capable of being propagated by the system 100 as needed (action 210). By way of example only, the attribute can be propagated to a cache memory, to a storage buffer, to a read/write buffer or to other memory, as well as to other devices, such as I/O devices, that are part of or otherwise connected to the system 100. The propagation may be performed inside and/or outside of the processor. The attribute is preferably passed in association with the instruction. When handled externally, the attribute is preferably passed in association with the instruction as part of a bus request. More preferably, in this case the attribute is attached to a bus transaction packet to be propagated to a destination. A typical propagation path may be as follows. First, a processor issues a data transfer operation. Then, the load/store unit receives a request in its queue. The load/store unit accesses the L1 cache if the request gets a cache hit. If there is a cache miss, the request is passed to the L2 cache request queue. The L2 cache is accessed if the request gets a cache hit. If there is an L2 cache miss, the request is passed to the bus to access the main memory. The bus conveys the L2 cache request to the memory attached to the bus. The memory is then accessed.

The attribute can be propagated to additional places in the processing system. For instance, assume the attribute is passed via a bus transaction packet from a first processor to a second processor. Once the second processor receives the attribute, it may then be passed internally along with an instruction to a buffer or other memory associated with the second processor. In accordance with one aspect of the present invention, a processor first determines whether it should execute an instruction. If the processor is to execute the instruction, then the processor proceeds, in accordance with one aspect of the present invention, to execute the instruction either with or without the error correction countermeasures based on the propagated attribute. No operating system intervention is needed to propagate the attribute.

Once an instruction is issued from a processor, the instruction may pass through many sections of the computing system until reaching a destination device such as the main memory or an I/O device. On its way to a destination device, however, load/store data may become corrupted. Corrupted data is associated with information showing that the data is corrupted. This can be accomplished, for example, by an error correcting code (ECC), parity bits, or an implementation-specific error detect bit. In this manner, the destination device can obtain information about the integrity of the received data and can take appropriate action. In accordance with aspects of the present invention, the attribute comprises one or more bits that propagate through the computing system to the destination device. If the bit(s) is set to indicate that error recovery should not be performed, the destination device will not perform any error recovery countermeasures.

In accordance with one aspect of the present invention, the operating system of the processor core 102 preferably establishes the predetermined range of memory addresses in which the error handling countermeasure capabilities should be disabled. For instance, the range of memory addresses can also be established by any software layer, including a library or the compiler. The range is preferably specified per program, because an error disabling attribute may be utilized by one program but not by another program.

In accordance with one aspect of the present invention, data on which it is desired not to use error correction is stored in a predetermined address range in memory. Thus, in accordance with one aspect of the present invention, error correction countermeasures will not be used with a certain type of data that is placed in memory in an address range that specifies that error correction should not be used.

Figure 3:
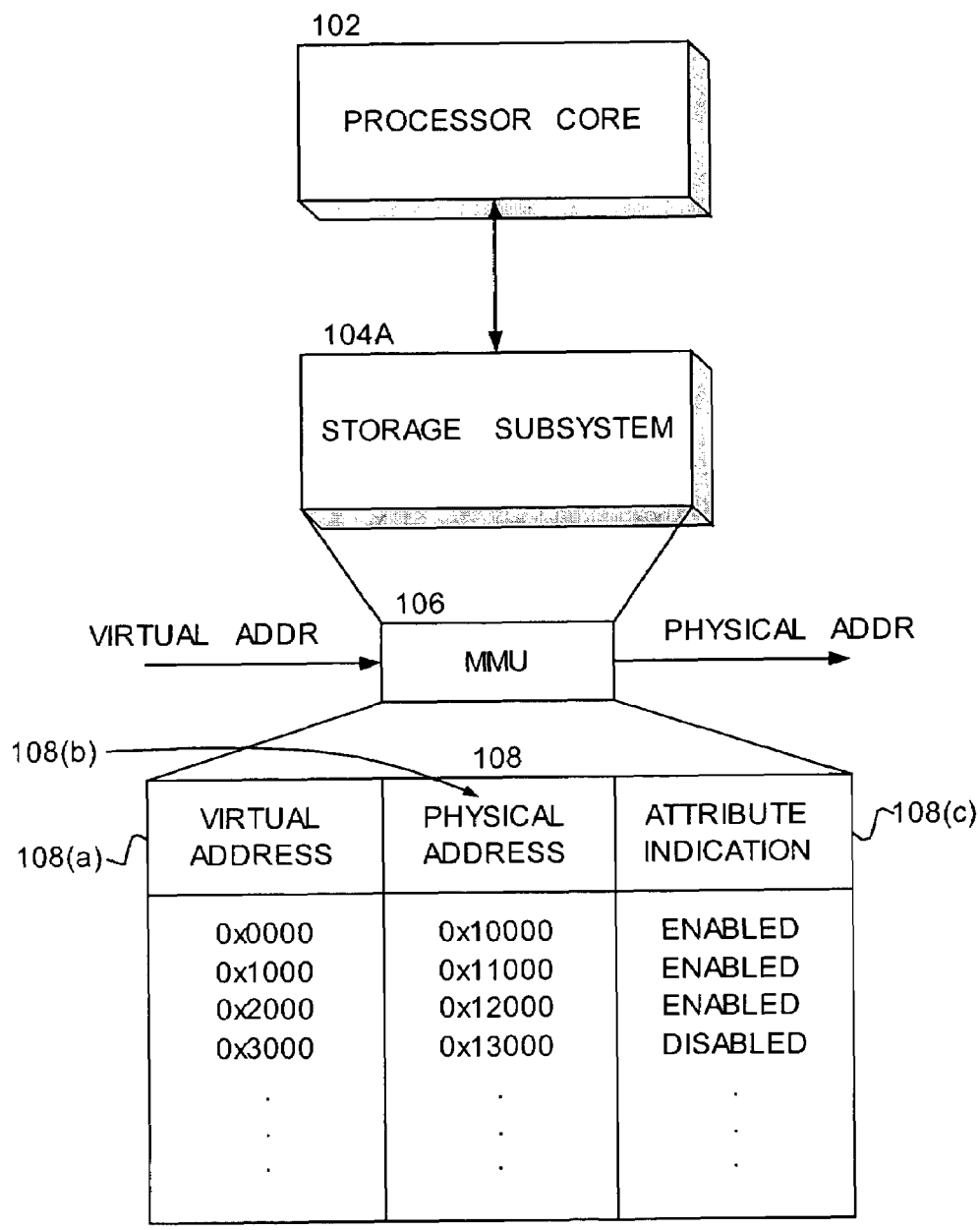
FIG. 3 is a block diagram of an alternative processing system in accordance with one or more further aspects of the present invention.
Figure 4:
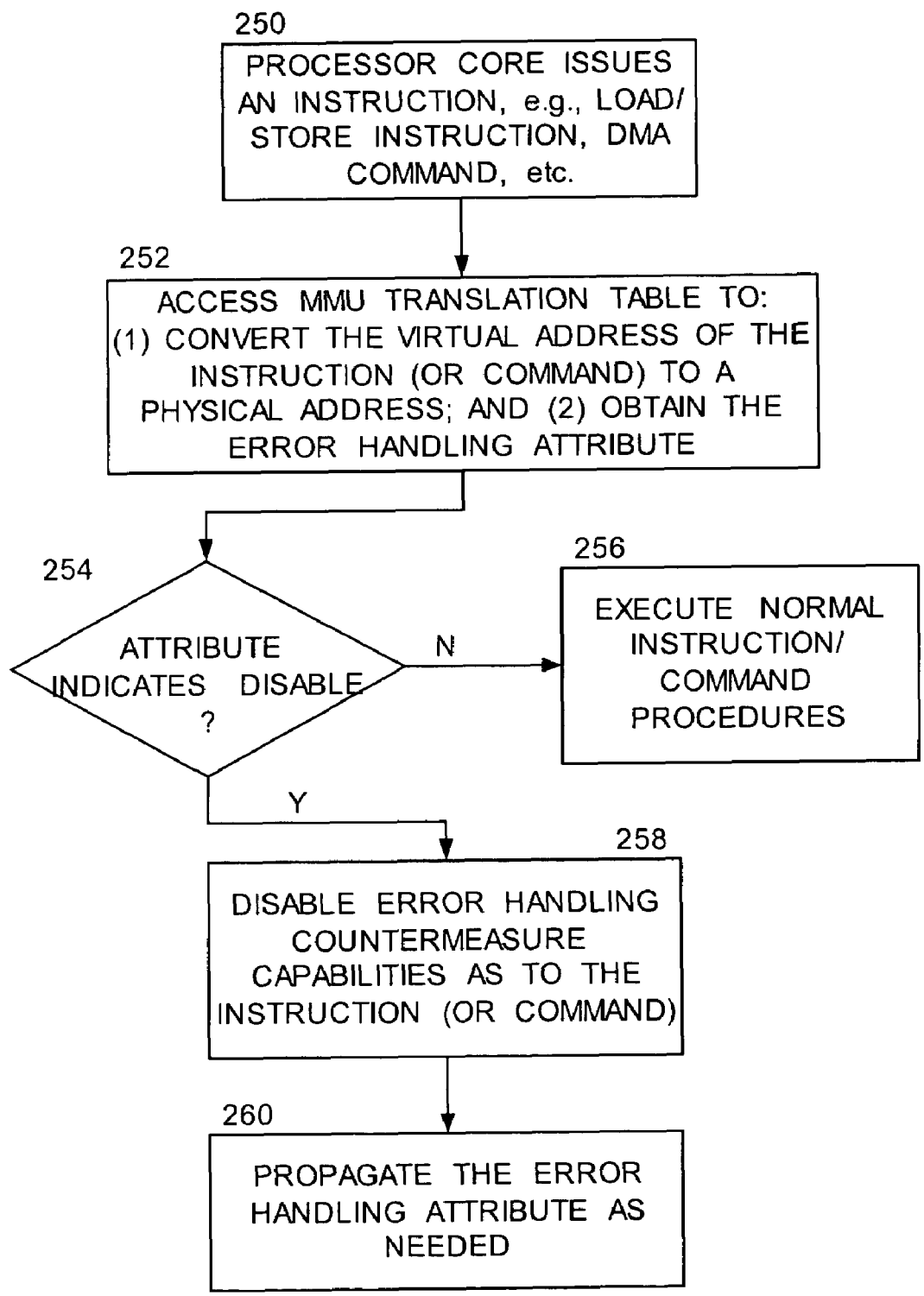
FIG. 4 is a flow diagram illustrating further process steps that may be carried out by the processing system of FIG. 3 in accordance with the present invention.

With reference to FIGS. 3 and 4, and in accordance with one or more further aspects of the present invention, the attribute indicative of whether error handling countermeasures should be disabled may also be introduced through a memory management unit (MMU) 106. The MMU 106 may be part of, or otherwise associated with, an overall storage subsystem 104A. Preferably, the overall storage subsystem 104A comprises the MMU 106, an L2 cache, an interface to the processor core and a bus interface. Alternatively, the MMU 106 may be integrated as part of the processor core 102. In general, the MMU 106 converts virtual addresses into physical addresses for the memory 104.

The memory management unit 106 preferably includes an address translation table 108 that may be accessed to determine a physical address in the memory 104 that is associated with a given virtual address. Virtual addresses are provided in column 108(a) and physical addresses are provided in column 108(b). For example, with reference to FIG. 4, at action 250, the processor core 102 may issue a data transfer operation, such as a DMA command or a lead or store instruction that specifies a particular virtual address, such as 0x3000. The memory management unit 106 may receive the virtual address of 0x3000 and access the address translation table 108 to obtain the associated physical address in the memory 104, which is 0x13000 (action 252).

In accordance with one or more aspects of the present invention, the address translation table 108 preferably also includes an attribute indication table, for instance depicted as an additional column 108(c) containing error handling countermeasure attributes. The attribute indication table associates respective attributes with the virtual and physical addresses of the table 108. Thus, at action 252, the memory management unit 106 may also access the attribute table to obtain an error correction attribute that is associated with the given virtual address. In this example, the virtual address of 0x3000 is associated with an attribute ("DISABLED") indicating that any error handling countermeasures should be disabled as to the data stored in the memory location specified by the virtual address of 0x3000 or the physical address of 0x13000. As shown in FIG. 3, the address translation table 108 is preferably a single integrated table including the virtual and physical address columns 108(a) and 108(b), respectively, as well as the error handling countermeasure attribute table 108(c). In an alternative, it is possible to maintain two separate tables. The first table would be a simple address translation table including columns 108(a) and 108(b). The second table, an attribute table including the column 108(c), would take the physical address output from the address translation table and obtain the attribute associated with it.

At action 254, a determination is preferably made as to whether the attribute obtained from the attribute table indicates that any error correction countermeasures should be disabled. For example, if the virtual address input into the MMU 106 were 0x2000, then the result of the determination at action 254 would be in the negative. In that case, the process flow preferably advances to action 256, where normal instructions (or command) procedures are carried out. On the other hand, if the virtual address input to the MMU 106 were 0x3000, then the result of the determination at action 254 would be in the affirmative and the process flow would preferably advance to action 258.

At action 258, the error handling countermeasure capabilities of the system are preferably disabled. Thus, the issuance of a data transfer operation to a specified address in the storage subsystem 104A may cause the system to disable the error handling countermeasure capabilities associated with such address. In this case, an attribute indicative of whether the error handling countermeasure capabilities of the system should be enabled or disabled is found in the MMU 106. Once again, the actions specified by FIG. 4 are preferably implemented under hardware control in a processor. In other preferred alternatives, the actions specified by FIG. 4 may also be implemented by use of an ASIC or the like, or by means of a software implementation.

In accordance with further aspects of the present invention, the attribute may be capable of being propagated by the system as needed (action 260) as previously described. By way of example only, the propagation may be performed inside and/or outside of the processor. When handled internally, the attribute is preferably passed in association with the instruction. When handled externally, the attribute is preferably passed in association with a bus request. More preferably, in this case the attribute is attached to a bus transaction packet to be propagated to a destination. At the destination, the attribute can be propagated to other places in the processing system. For instance, assume the attribute is passed via a bus transaction packet from a first processor to a second processor. Once the second processor receives the attribute, it may then be passed internally along with an instruction to a buffer or other memory associated with the second processor.

Figure 5:
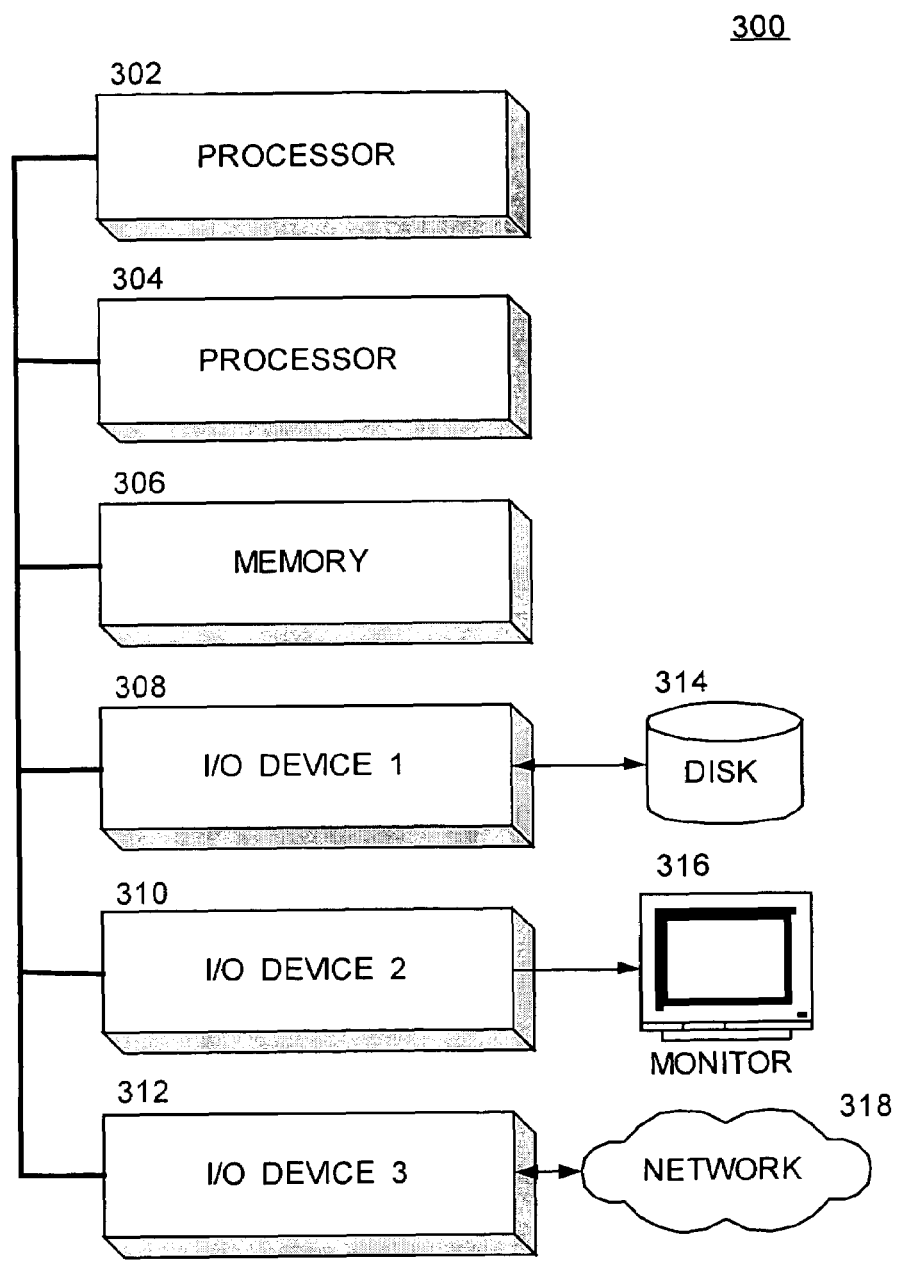
FIG. 5 is a diagram illustrating the structure of a processing system including more than one sub-processing unit in accordance with one or more further aspects of the present invention.
Figure 6:
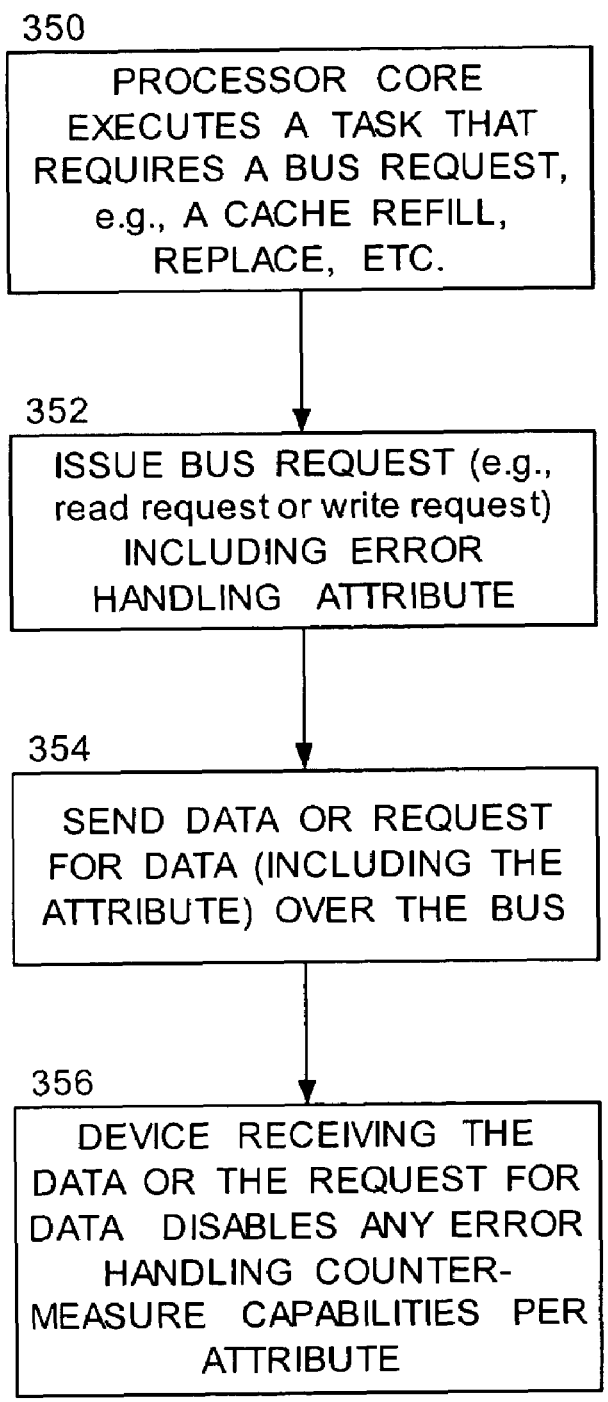
FIG. 6 is a flow diagram illustrating process steps that may be carried out by the multi-processing system of FIG. 5 in accordance with one or more aspects of the present invention.

Reference is now made to FIGS. 5 and 6, which illustrate one or more further aspects of the present invention. In particular, the apparatus illustrated in FIG. 5 and the process flow illustrated in FIG. 6 represent a further example of how attributes may be utilized in a system to at least temporarily disable error handling countermeasures as to certain data within a processing context. In particular, FIG. 5 illustrates a multi-processing system 300 including a first processor 302, a second processor 304, a shared memory 306, a first input/output device 308, a second input/output device 310, and a third input/output device 312. The first input/output device 308 may be an interface to or a controller for a database 314, such as a hard-disk system or any other known bulk-memory storage device. A second input/output device 310 may be an interface to or controller for a monitor 316, and the third input/output device 312 may be a network interface device providing an interconnection to a network 318, such as an intranet, a wireless network, the Internet, etc. It is noted that the number of processors and/or I/O devices is not critical to the invention.

In accordance with one or more aspects of the present invention, one or more instructions issued by the first and/or second processors 302, 304, are augmented with an error correction attribute that is indicative of whether an error correction countermeasure should be carried out. In this way, the attribute is preferably propagated through the system 300, such that one or more of the other elements of the system 300 do not carry out any error handling countermeasures. For example, at action 350 (FIG. 6) the processor 302 may issue one or more instructions or carry out certain data processing that requires a bus request, such as a cache refill, a cache replace, etc. In accordance with various aspects of the invention, the bus request is invoked and the attribute is attached to a transaction packet that is transmitted over a bus or over a network. Thus, the attribute follows the bus request (action 352). The bus request will typically include the sending of data (writing data to the bus) or a request for data (reading data from the bus), which preferably includes the attribute (action 354) relating to enabling or disabling error handling countermeasures.

In accordance with one aspect of the present invention, the transaction packet preferably includes some or all of the following fields: (1) request type (write, read, sync, interrupt, etc.); (2) address; (3) transfer size; (4) transfer attribute(s) including (a) whether the cache is inhibited, (b) whether to write through, (c) whether coherency is employed, (d) guarded or unguarded, and/or (e) priority level (if multiple priority levels are used; and (5) whether RAS is disabled.

One or more devices receiving data from the processor 302 or receiving a request for data from the processor 302 vis-à-vis the bus request also receives the attribute indicating whether any error handling countermeasures should be carried out. If the attribute so indicates, the device receiving the data or the request for data disables the error handling countermeasure in accordance with the attribute (action 356). If more than one error correction countermeasure is used, then one or more of the error handling countermeasures can be disabled in accordance with the attribute.

Advantageously, aspects of the present invention permit an attribute indicative of whether error handling countermeasure capabilities should be enabled or disabled to be associated with data in a processing system such that various different data may be treated differently. In particular, some data may be more sensitive than other data in terms of whether processing errors may be tolerated to one extent or another. Thus, for example, streaming video data may be associated with an attribute indicating that any error handling countermeasure capabilities may be disabled. Other data, however, which may be too sensitive to permit processing errors to occur may be associated with an attribute indicating that any error handling countermeasure capabilities should be enabled. This may be very useful under certain circumstances, where executing an error correction process could do more harm than good.

Additionally, special purpose instructions that indicate whether error handling countermeasures should not be used can be issued by a processor. For example, instructions such as "load_wo_error_detect" (in other words, load without processing error detection) and "store_wo_error_detect" (in other words, store without processing error detection) can be used when transferring data. Special purpose DMA commands may also be employed to indicate whether error handling countermeasures should not be used. It should be understood that such instructions and commands are not tied to any particular operating system or programming language. In some implementations, an override feature may be provided. The override feature may indicate that the instruction should (or should not) be used with an error handling countermeasure. In such a case, the MMU may enable an error handling countermeasure even if the special purpose instruction or special purpose DMA command indicates that countermeasures should not be used. Conversely, the MMU may disable an error handling countermeasure even if the special purpose instruction or special purpose DMA command indicates that countermeasures should be used. By way of example only, the override feature may be an indicator bit in the special purpose instruction or special purpose DMA command, or may be an override indicator within the MMU itself.

As noted above, the various embodiments of the invention may be implemented in a single processor system or a multi-processor system. For example, with reference to FIG. 7, a multi-processing system 110 may be adapted to incorporate any combination of the embodiments illustrated in FIGS. 1-6 in accordance with various aspects of the present invention.

The multi-processing system 110 includes a plurality of processors 112 (any number may be used) coupled to a shared memory 116, such as a DRAM, over a bus 118. It is noted that the shared DRAM memory 116 is not required (and thus is shown in dashed line). Indeed, in some implementations, one or more of the processing units 112 may employ its own memory (not shown) and thus the shared memory 116 may not be necessary. In other implementations, the shared memory 116 may be embedded in or otherwise integrated as part of the processor chip incorporating the multi-processing system 110, as opposed to being a separate, external memory. For instance, the shared memory 116 can be in a separate location on the chip or can be integrated with one or more of the processors 112 that comprise the multi-processing system 110.

One of the processors 112 is preferably a main processing unit, for example, processing unit 112A. The other processing units 112 are preferably sub-processing units (SPUs), such as processing unit 112B, 112C, 112D, etc. The processing units 112 may be implemented using any of the known computer architectures. All of the processing units 112 need not be implemented using the same architecture; indeed they may be of heterogeneous or homogenous configurations. In operation, the main processing unit 112A preferably schedules and orchestrates the processing of data and applications by the sub-processing units 112B-D such that the sub-processing units 112B-D perform the processing of the data and applications in a parallel and independent manner.

It is noted that the main processing unit 112A may be disposed locally with respect to the sub-processing units 112B-D, such as in the same chip, in the same package, on the same circuit board, in the same product, etc. Alternatively, the main processing unit 112A may be remotely located from the sub-processing units 112B-D, such as in different products, which may be coupled over a bus, a communications network (such as the Internet) or the like. Similarly, the sub-processing units 112B-D may be locally or remotely located from one another.

Figure 7:
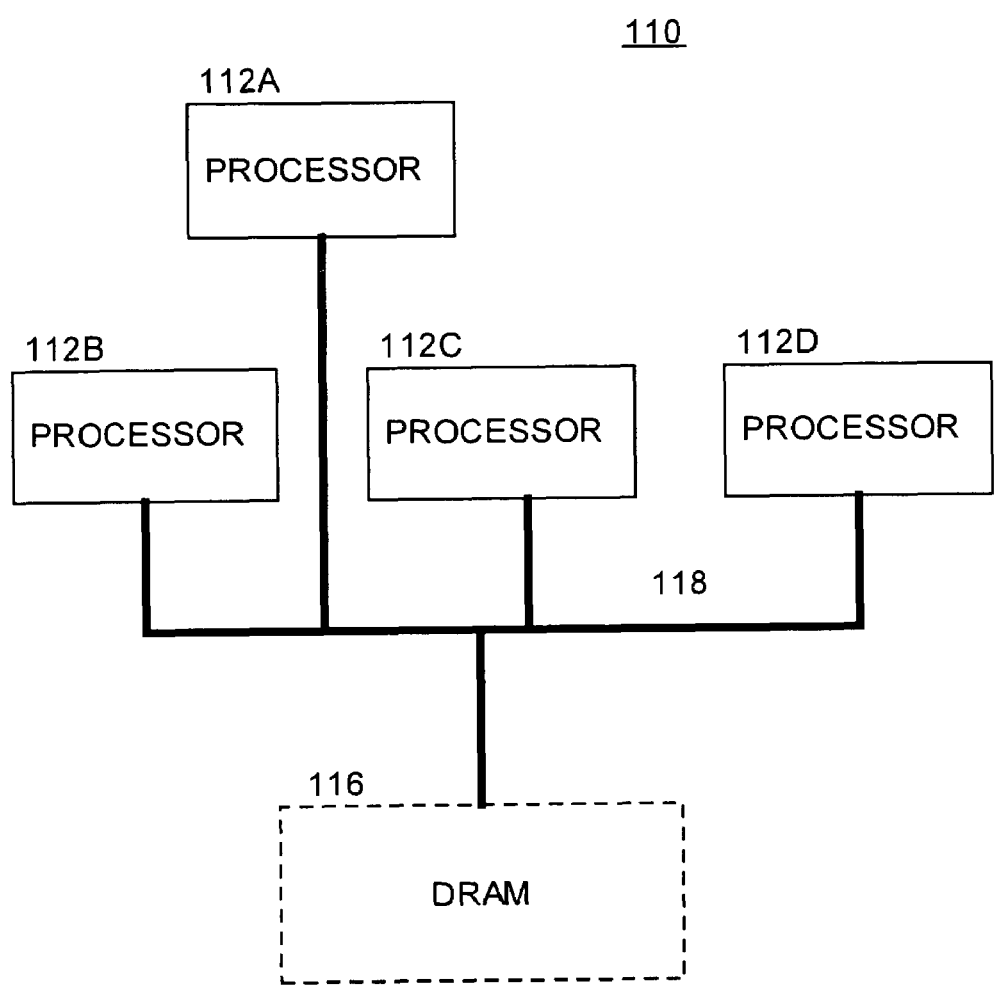
FIG. 7 is a diagram illustrating the structure of a multi-processing system in accordance with one or more aspects of the present invention.

The multi-processor system 110 of FIG. 7 may be adapted to incorporate the features of the invention discussed above with respect to FIGS. 1-2. Indeed, one or more of the processors 112 of the multi-processor system 110 may include the functionality of the processor core 102 of FIG. 1, and the DRAM 116 may include the memory map aspects of the memory 104 of FIG. 1 to employ the attribute(s) indicative of whether error handling countermeasure capabilities should be enabled or disabled. Similarly, one or more of the processors 112 of the multi-processor system 110 may include the functionality of the processor core 102 of FIG. 3, and the DRAM 116 may be replaced by or include the functionality of the MMU 106 and the storage subsystem 104A of FIG. 3 to employ the attribute(s) indicative of whether error handling countermeasure capabilities should be enabled or disabled. Still further, the multi-processor system 110 may be adapted to include the functionality of the multi-processor system of FIG. 5 such that one or more instructions issued by one or more of the processors 112 are augmented with an error correction attribute that is indicative of whether an error correction countermeasure should be carried out.

Figure 8:
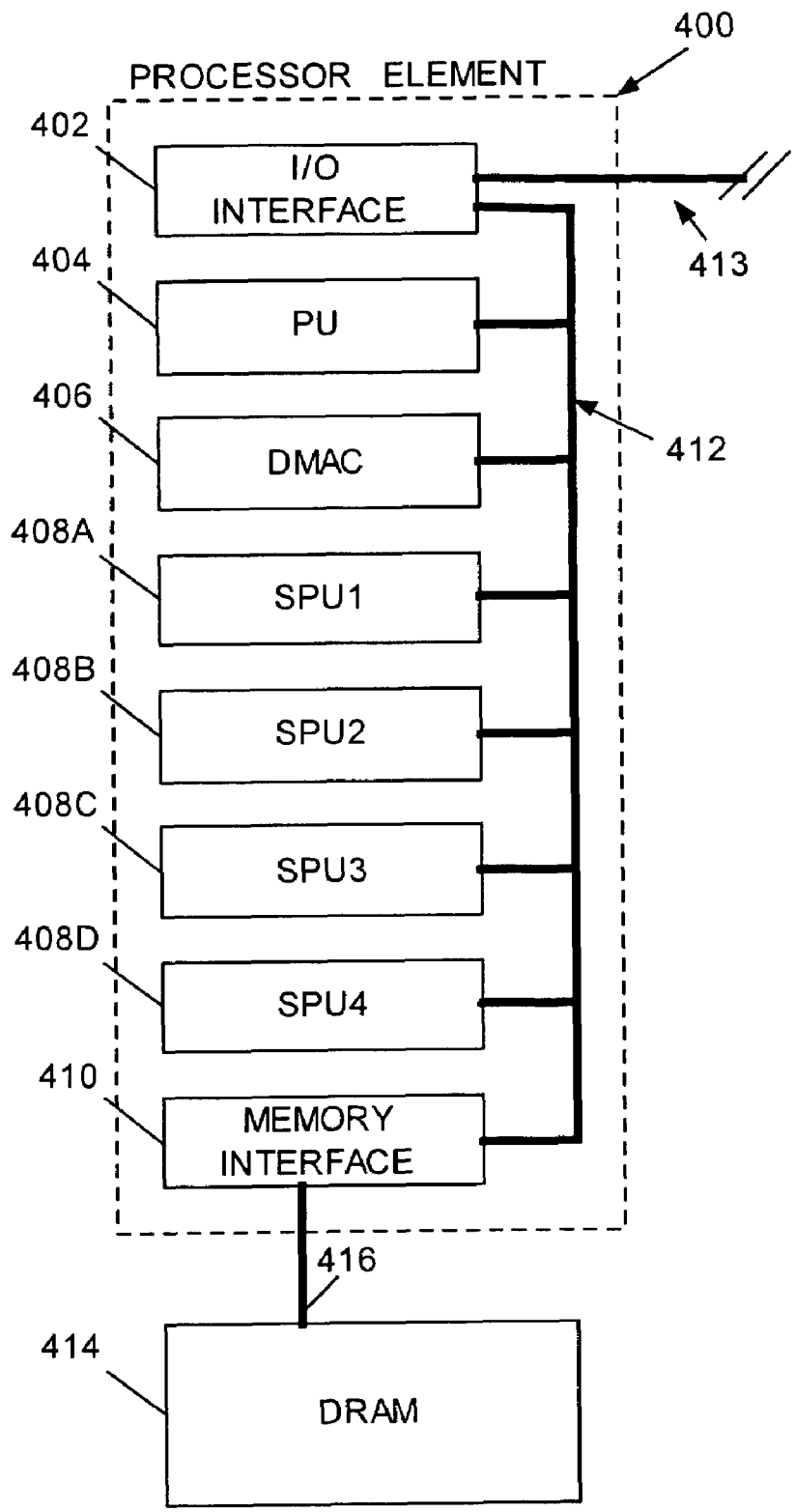
FIG. 8 is a diagram illustrating the structure of a processor element in accordance with aspects of the present invention.

Reference is now made to FIG. 8, which illustrates a preferred computer architecture. In accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

In this regard, FIG. 8 illustrates a block diagram of a basic processing module or processor element (PE) 400. As shown in this figure, PE 400 comprises an I/O interface 402, a processing unit (PU) 404, a direct memory access controller (DMAC) 406, and a plurality of sub-processing units 408, namely, sub-processing unit 408A, sub-processing unit 408B, sub-processing unit 408C, and sub-processing unit 408D. A local (or internal) PE bus 412 transmits data and applications among the PU 404, the sub-processing units 408, the DMAC 406, and a memory interface 410. The local PE bus 412 can have, e.g., a conventional architecture or can be implemented as a packet switch network. Implementation as a packet switch network, while requiring more hardware, increases available bandwidth. The I/O interface 402 may be connected to one or more external I/O devices (not shown), such as frame buffers, disk drives, or other types of devices via an I/O bus 413.

The PE 400 may be adapted to incorporate any combination of the embodiments illustrated in FIGS. 1-6 to employ the attribute(s) indicative of whether error handling countermeasure capabilities should be enabled or disabled.

The PE 400 can be constructed using various methods for implementing digital logic. The PE 400 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 400 also could be implemented using superconducting material, e.g., rapid single-flux-quantum (RSFQ) logic.

The PE 400 is closely associated with a dynamic random access memory (DRAM) 414 through a high bandwidth memory connection 416. The DRAM 414 functions as the main memory for the PE 400. Although the DRAM 414 preferably is a dynamic random access memory, the DRAM 414 could be implemented using other means, e.g., as a static random access memory (SRAM), a magnetic random access memory (MRAM), an optical memory, a holographic memory, etc. In certain implementations, the memory 414 may be embedded in or otherwise integrated as part of the processor chip incorporating the PE 400, as opposed to being a separate, external memory. For instance, the memory 414 can be in a separate location on the chip or can be integrated with one or more of the processors that comprise the PE 400. The DMAC 406 and the memory interface 410 facilitate the transfer of data between the DRAM 414 and the sub-processing units 408 and the PU 404 of the PE 400. It is noted that the DMAC 406 and/or the memory interface 410 may be integrally or separately disposed with respect to the sub-processing units 408 and the PU 404. Indeed, instead of a separate configuration as shown, the DMAC 406 function and/or the memory interface 410 function may be integral with one or more (preferably all) of the sub-processing units 408 and the PU 404. Thus, the DMAC 406 is shown in dashed lines.

The PU 404 can be, e.g., a standard processor capable of stand-alone processing of data and applications. In operation, the PU 404 schedules and orchestrates the processing of data and applications by the sub-processing units. The sub-processing units preferably are single instruction, multiple data (SIMD) processors. Under the control of the PU 404, the sub-processing units perform the processing of these data and applications in a parallel and independent manner. The DMAC 406 controls accesses by the PU 404 and the sub-processing units 408 to the data and applications stored in the shared DRAM 414. It is noted that the PU 404 may be implemented by one of the sub-processing units 408 taking on the role of a main processing unit that schedules and orchestrates the processing of data and applications by the sub-processing units 408.

It should be understood that the above processing modules and architectures are merely exemplary, and the various aspects of the present invention may be employed with other structures, including, but not limited to multiprocessor systems of the types disclosed in U.S. Pat. No. 6,526,491, entitled "Memory Protection System and Method for Computer Architecture for Broadband Networks," issued on Feb. 25, 2003, and U.S. application Ser. No. 09/816,004, entitled "Computer Architecture and Software Cells for Broadband Networks," filed on Mar. 22, 2001, which are hereby expressly incorporated by reference herein.

Figure 9:
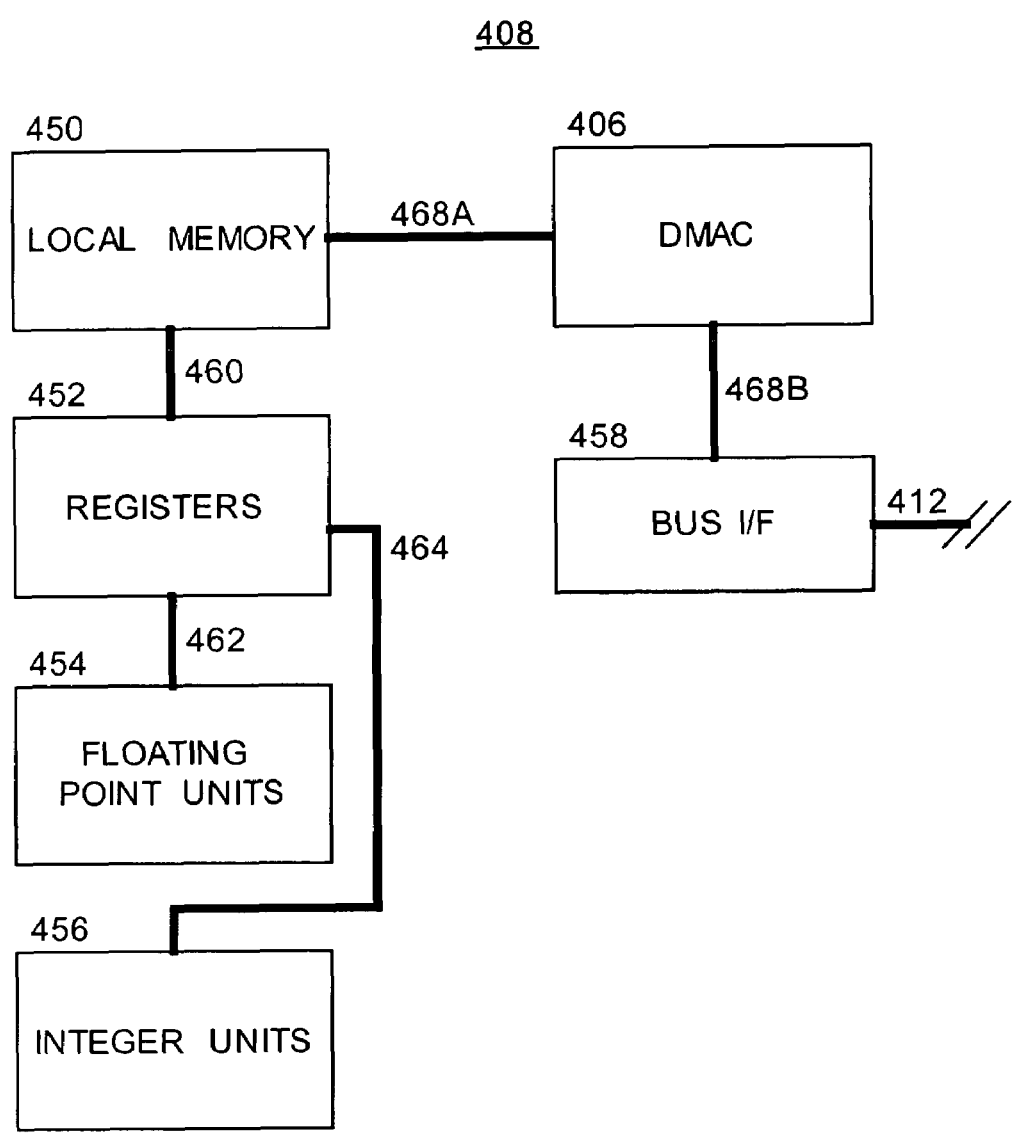
FIG. 9 is a diagram illustrating the structure of a sub-processing unit (SPU) in accordance with the present invention.

FIG. 9 illustrates the preferred structure and function of a sub-processing unit 408. The sub-processing unit 408 includes local memory 450, registers 452, one or more floating point units 454 and one or more integer units 456. Again, however, depending upon the processing power required, a greater or lesser number of floating points units 454 and integer units 456 may be employed. In a preferred embodiment, the local memory 450 contains 456 kilobytes of storage, and the capacity of registers 452 is 128×128 bits. The floating point units 454 preferably operate at a speed of 32 billion floating point operations per second (32 GFLOPS), and the integer units 456 preferably operate at a speed of 32 billion operations per second (32 GOPS).

The local memory 450 may or may not be a cache memory. The local memory 450 is preferably constructed as a static random access memory (SRAM). A PU 404 may require cache coherency support for direct memory accesses initiated by the PU 404. Cache coherency support is not required, however, for direct memory accesses initiated by the sub-processing units 408 or for accesses from and to external devices.

The sub-processing unit 408 further includes or is otherwise associated with a bus interface (I/F) 458 for transmitting applications and data to and from the sub-processing unit 408. In a preferred embodiment, the bus I/F 458 is coupled to the DMAC 406, which is shown in dashed line to indicate that it may be integrally disposed within the sub-processing unit 408 as shown or may be externally disposed (as shown in FIG. 8). A pair of busses 468A, 468B interconnect the DMAC 406 between the bus I/F 458 and the local memory 450. The busses 468A, 468B are preferably 456 bits wide.

The sub-processing unit 408 further includes internal busses 460, 462 and 464. In a preferred embodiment, the bus 460 has a width of 456 bits and provides communications between the local memory 450 and the registers 452. The busses 462 and 464 provide communications between, respectively, the registers 452 and the floating point units 454, and the registers 452 and the integer units 456. In a preferred embodiment, the width of the busses 464 and 462 from the registers 452 to the floating point or the integer units is 384 bits, and the width of the busses 464 and 462 from the floating point or the integer units 454, 456 to the registers 452 is 128 bits. The larger width of these busses from the registers 452 to the floating point or the integer units 454, 456 than from these units to the registers 452 accommodates the larger data flow from the registers 452 during processing. A maximum of three words are needed for each calculation. The result of each calculation, however, normally is only one word.

Figure 10:
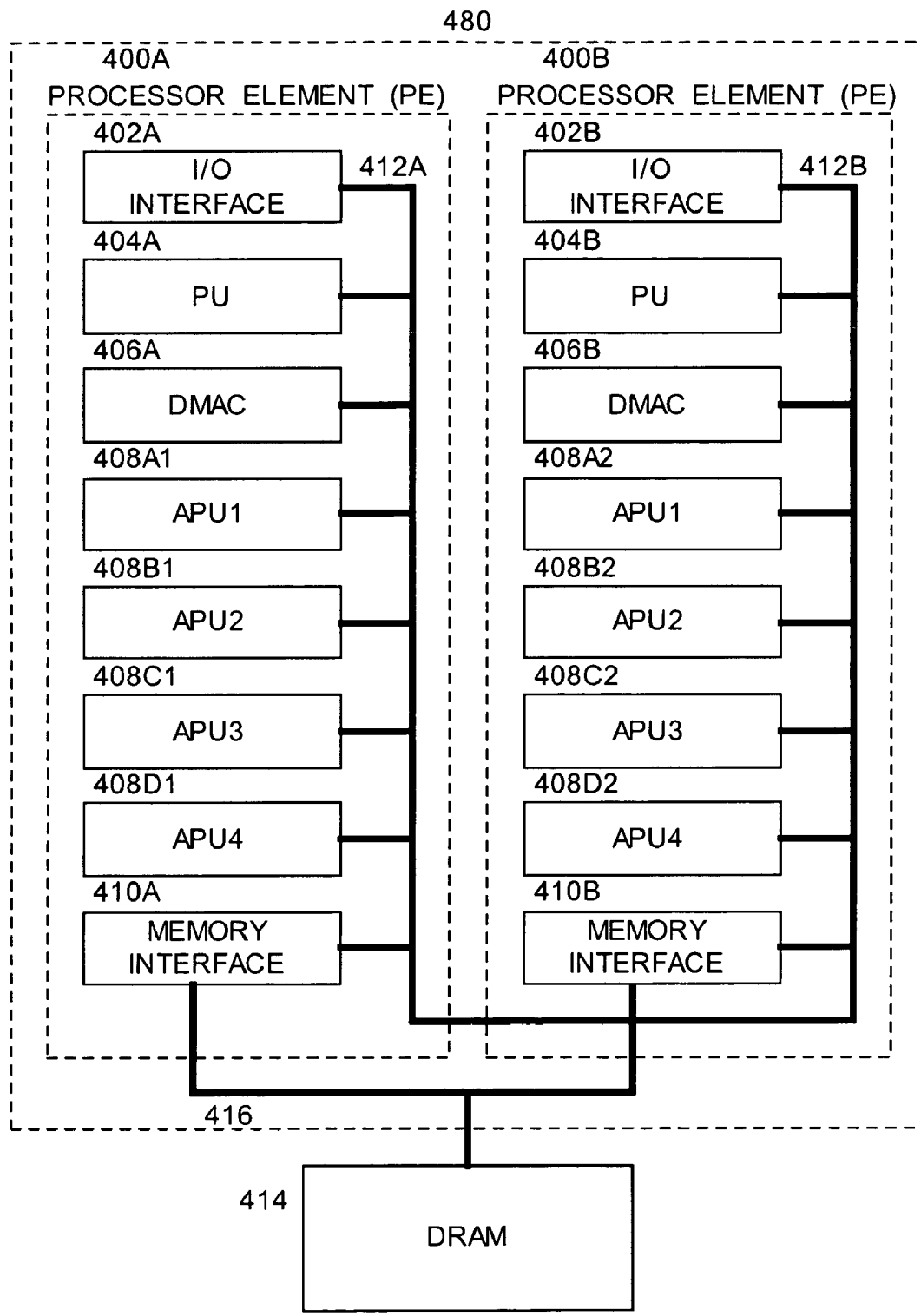
FIG. 10 is a diagram illustrating the structure of a processing system including multiple processor elements in accordance with one or more further aspects of the present invention.

With reference to FIGS. 8 and 10, a number of processor elements 400 may be joined or packaged together to provide enhanced processing power. For example, as shown in FIG. 10, two or more processor elements 400A, 400B may be packaged or joined together, e.g., within one or more chip packages, to form a set of multi-processor units. This configuration may be referred to as a broadband engine (BE). As shown in FIG. 10, the broadband engine 480 contains the two processor elements 400A, 400B, which are interconnected for data communication over a bus 412, shown as interconnected busses 412A and 412B. An additional data bus 416 is preferably provided to permit communication between the processor elements 400A, 400B (via the memory interfaces 410A and 410B) and the shared DRAM 414. One or more input/output (I/O) interfaces 402A and 402B and an external bus (not shown) provide communications between the broadband engine 480 and any external elements. Each of the processor elements 400A and 400B of the broadband engine 480 may perform processing of data and applications in a parallel and independent manner analogous to the parallel and independent processing of applications and data performed by the sub-processing elements 408 discussed hereinabove with respect to FIG. 8.

A plurality of the systems of FIGS. 8 and/or 10 may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 11:
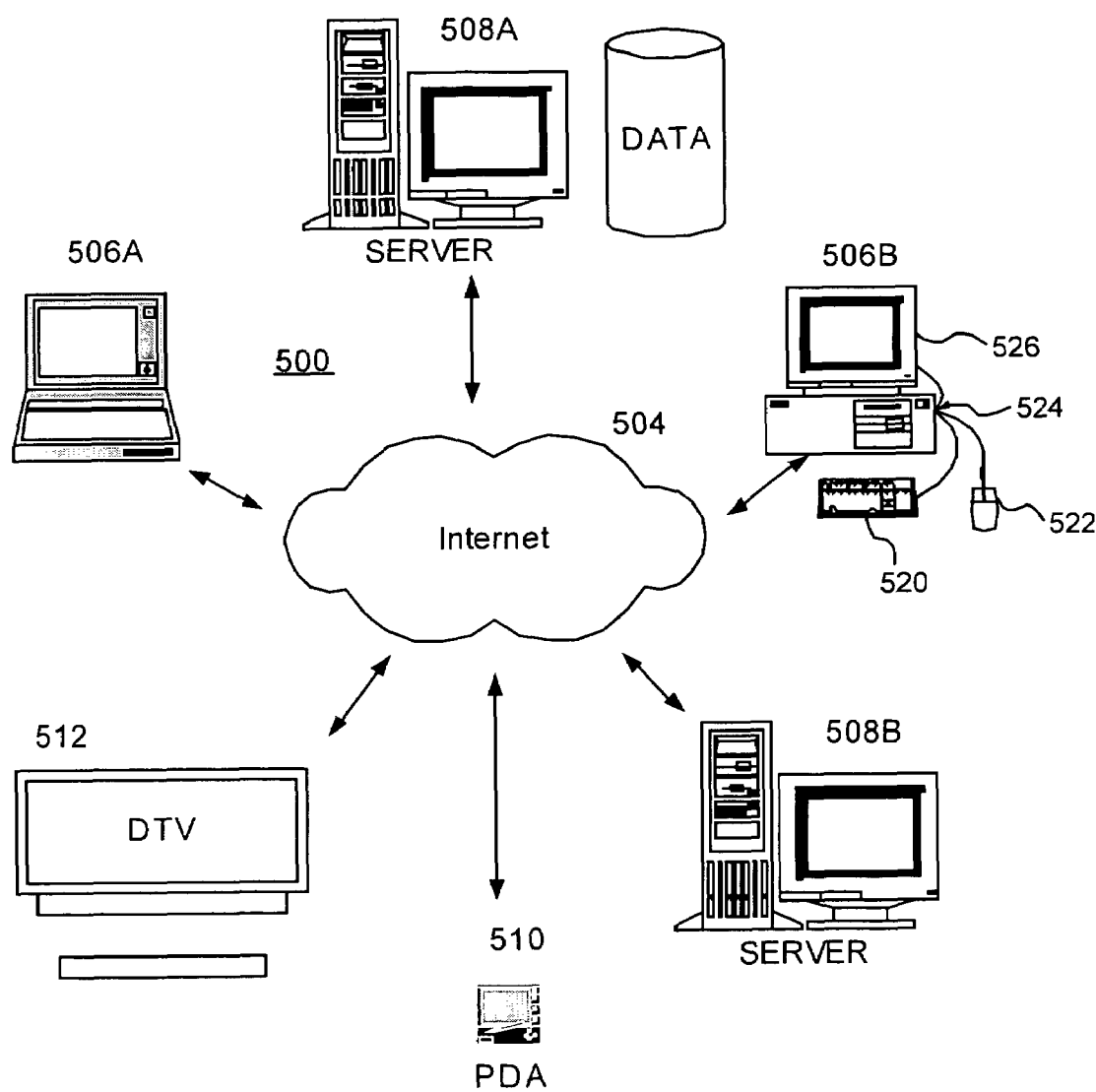
FIG. 11 is a diagram illustrating a plurality of multi-processing units are disposed in different products that may be interconnected by way of a network in accordance with one or more further aspects of the present invention.

With reference to FIG. 11, the multi-processing elements 408 or BEs 480 may be distributed among a plurality of products to form a multi-processing system 500. The elements or members (implemented as computer and/or computing devices) of the system 500 are preferably in communication over a network 504. The network 504 may be a local area network (LAN), a global network such as the Internet, or any other computer network.

The members that are connected to the network 504 include, e.g., client computers 506A and 506B, server computers 508A and 508B, personal digital assistants (PDAs) 510, digital television (DTV) 512, and other wired or wireless computers and computing devices. For example, the client 506A may be a laptop computer constructed from one or more of the PEs 400 or other suitable multi-processing systems. The client 506B may be a desk-top computer (or set top box) constructed from one or more of the PEs 400 or other suitable multi-processing systems. Further, the server 506A may be an administrative entity (employing a database capability), which is also preferably constructed from one or more of the PEs 400. And so on. Each computer/computing device can include, for example, one or more computing devices having user inputs such as a keyboard 520 and mouse 522 (and various other types of known input devices such as pen-inputs, joysticks, buttons, touch screens, etc.), a display interface 524 (such as connector, port, card, etc.) for connection to a display 526, which could include, for instance, a CRT, LCD, or plasma screen monitor, TV, projector, etc. Each computer/computing device also preferably includes the normal processing components found in such devices such as one or more memories and one or more processors located within the computer processing system.

In accordance with this modular structure, the number of PEs 400 employed by a particular computer system is based upon the processing power required by that system. For example, a server may employ four PEs 400, a workstation may employ two PEs 400 and a PDA may employ one PE 400. The number of sub-processing units of a PE 400 assigned to processing a particular software cell depends upon the complexity and magnitude of the programs and data within the cell.

Figure 12:
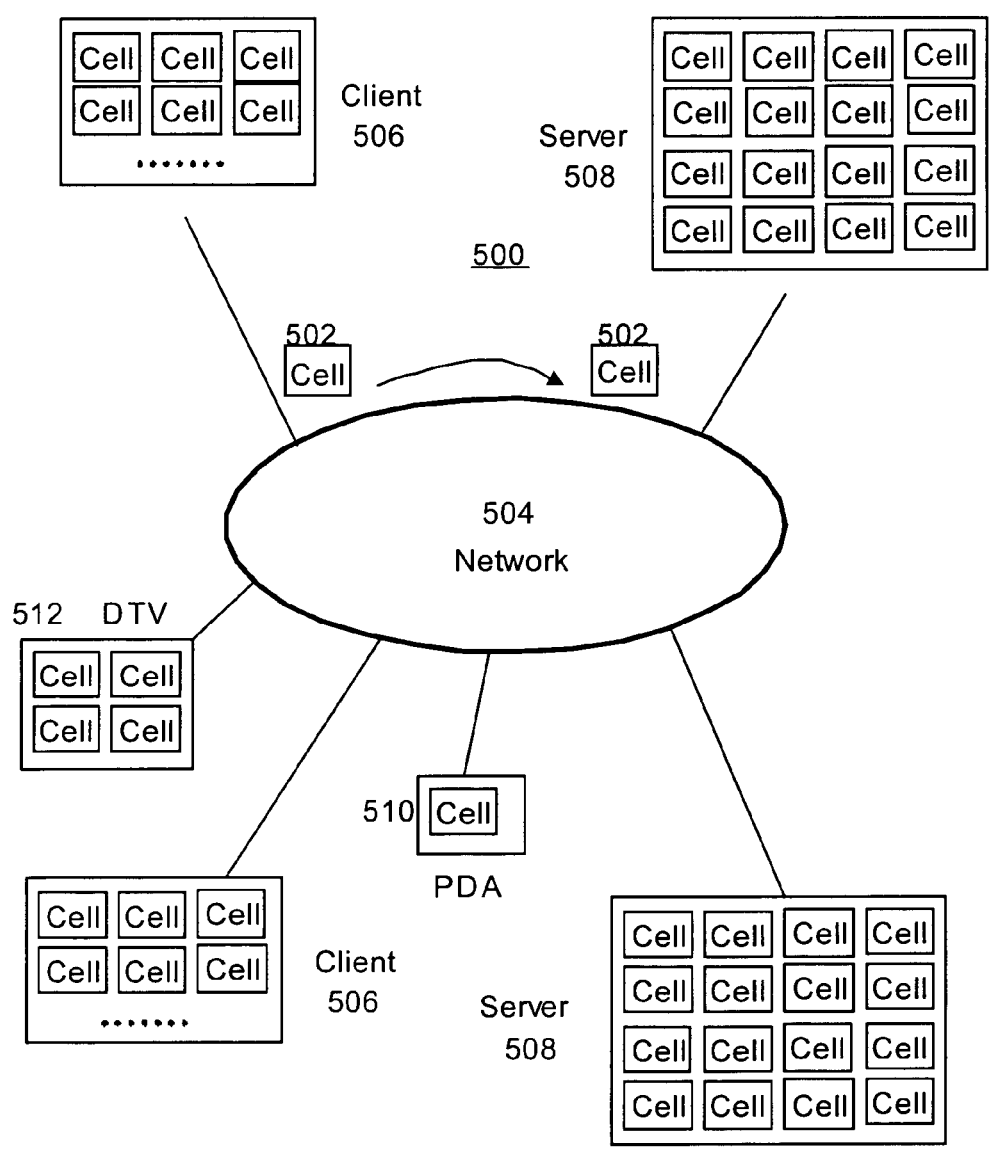
FIG. 12 is a block diagram of a software cell architecture that may be used in conjunction with aspects of the present invention.

With reference to FIG. 12, the servers 508 of the system 500 perform more processing of data and applications than the clients 506, the servers 508 contain more computing modules (e.g., PEs 400) then the clients 506. The PDAs 510, on the other hand, in this example perform the least amount of processing. Thus, the PDAs 510 contain the smallest number of PEs 400, such as a single PE 400. The DTVs 512 perform a level of processing that is substantially between that of the clients 506 and the servers 508. Thus, the DTVs 512 contain a number of processor elements between that of the clients 506 and the servers 508.

The homogenous configuration for the system 500 facilitates adaptability, processing speed, and processing efficiency. Because each member of the system 500 performs processing using one or more (or some fraction) of the same computing module, e.g., processor element 400, the particular computer or computing device performing the processing of data and/or application is unimportant because the processing of such data and applications may be shared among the network's members. By uniquely identifying the software cells comprising the data and applications processed by the system 500, the processing results can be transmitted to the computer or computing device requesting the processing regardless of where this processing occurred. Because the modules performing this processing have a common structure and employ a common instruction set architecture, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by the system 500, the data and applications processed by this system may be packaged into uniquely identified, uniformly formatted software cells 502. Each software cell 502 contains, or can contain, both applications and data. Each software cell also contains an ID to globally identify the cell throughout the network 504 and the system 500. This uniformity of structure for the software cells, and the software cells unique identification throughout the network, facilitates the processing of applications and data on any computer or computing device of the network 504. For example, a client 506 may formulate a software cell 502 but, because of the limited processing capabilities of the client 506, transmit the software cell 502 to a server 508 for processing. Software cells 502 can migrate, therefore, throughout the network 504 for processing on the basis of the availability of processing resources on then network 504.

The homogenous structure of processors and software cells 502 of the system 500 also avoids many of the problems of today's heterogeneous networks. For example, inefficient programming modules which seek to permit processing of applications on any ISA using any instruction set, e.g., virtual machines such as the Java virtual machine, are avoided. The system 500, therefore, can implement broadband processing far more effectively and efficiently than conventional networks.

Various aspects of the present invention permit a multi-processor system to employ an attribute indicative of whether error handling countermeasure capabilities should be enabled or disabled to be associated with data. This advantageously permits the processing system to treat various data differently regarding error handling countermeasures.

While attributes can be used to indicate whether or not to implement a countermeasure, they can also relate to the type of data used in a task. Preferably, an attribute may be dynamically or statically generated or assigned based upon one or more data types. For example, an attribute may be used to indicate whether the data is real time or non-real time. In another example, the attribute may be used to indicate whether the data is streaming or non-streaming. In yet another example, the attribute can be used to indicate whether a user may become aware of a defect or error. For instance, if the data is sound data, it is possible that the user may hear a data error.

In a preferred embodiment, it is desirable to reorganize/reallocate tasks among different processors in a multi-processor system based upon an attribute. For example, the PE 400 (FIG. 8) preferably includes the SPUs 408A-D and the PU 404 for managing the SPUs 408A-D. The SPUs 408A-D can be configured to execute processor tasks that have associated attributes. A detecting unit, such as the MMU 106, can detect the attributes of the processor tasks. An execution unit, such as the PU 404, can reallocate the processor tasks based upon attribute information from the MMU 106. Desirably, the execution unit performs the reallocation by taking into account whether an error occurs in one of the SPUs 408A-D.

Figure 13:
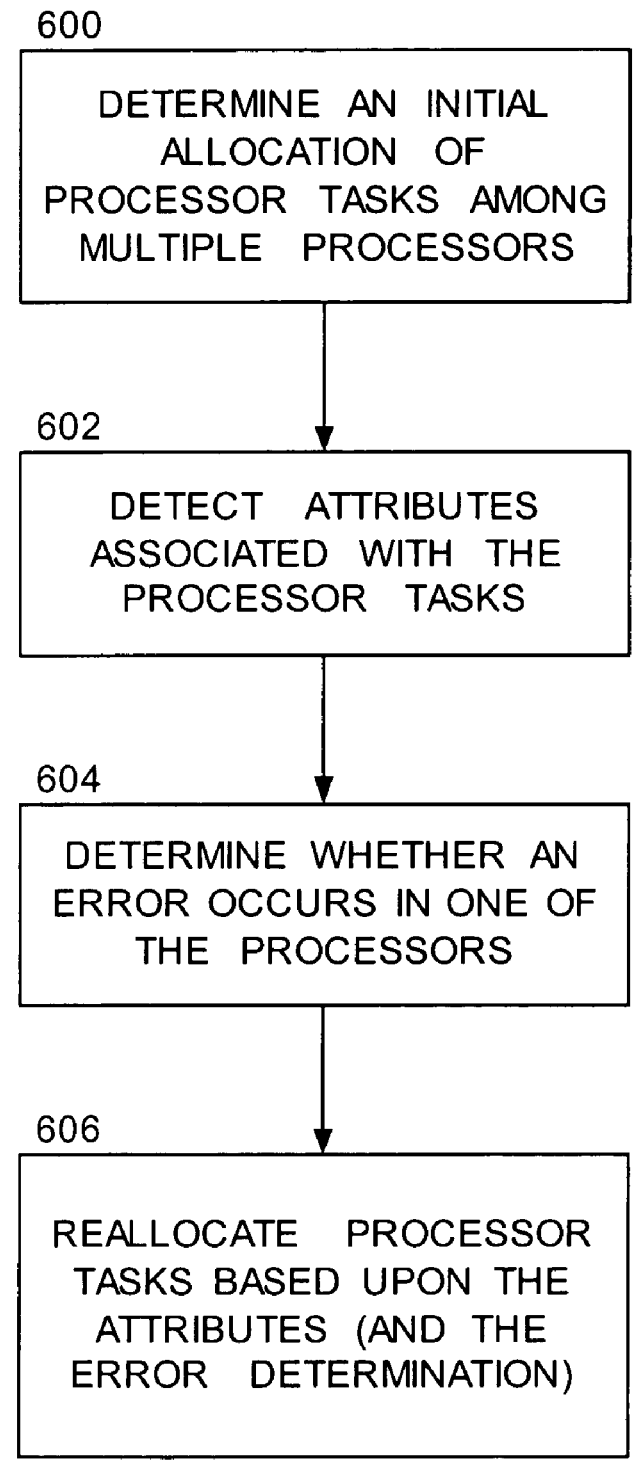
FIG. 13 is a flow diagram illustrating process steps that may be carried out by a multi-processing system in accordance with one or more aspects of the present invention.

FIG. 13 illustrates a flowchart outlining a preferred reallocation process. First, an initial determination is made on how to allocate processor tasks among multiple processors in step 600. An execution unit such as the PU 404 may perform the initial determination. Then attributes associated with the processor tasks are detected in step 602 by a detection unit such as the MMU 106. Optionally, in step 604 a determination can be made whether an error has occurred in one of the processors. Finally, the processor tasks may be reallocated based upon the attributes in step 606. If the optional step 604 is performed, the reallocation may also be based on whether an occurred in one of the processors.

It should be understood that processing in accordance with aspects of the present invention, for instance detecting whether a countermeasure should be disabled, propagating the disable attribute to a memory, propagating the disable attribute via a bus, reallocating processor tasks based upon attributes, etc., can be implemented in various ways. In one alternative, it is determined whether an address is within a range of addresses for which the countermeasure should be disabled. In another alternative, an attribute table is examined during MMU processing. In a further alternative, a special load or store instruction, or a special DMA instruction/operation can be provided that indicates whether a countermeasure should be disabled. The various processing features may be implemented incorporating one or more of the above alternatives. Furthermore, processing can be performed in single or multi-processor systems.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of processing instructions and data, comprising:

determining whether an error correction countermeasure should be used in association with an instruction or data to correct an error of the instruction or data; and disabling the use of the error correction countermeasure based on the determination, so that if the error correction countermeasure is disabled, then the error of the instruction or data will not be corrected by the error correction countermeasure;

wherein the determination of whether the error correction countermeasure should be used comprises checking whether an address specified by the instruction or the data is within a range of addresses.

2. A method of processing instructions and data, comprising:
   determining whether an error correction countermeasure should be used in association with an instruction or data to correct an error of the instruction or data; and
   disabling the use of the error correction countermeasure based on the determination, so that if the error correction countermeasure is disabled, then the error of the instruction or data will not be corrected by the error correction countermeasure;
   wherein the instruction is a load instruction or a store instruction.

3. A method of processing instructions and data, comprising:
   determining whether an error correction countermeasure should be used in association with an instruction or data to correct an error of the instruction or data; and
   disabling the use of the error correction countermeasure based on the determination, so that if the error correction countermeasure is disabled, then the error of the instruction or data will not be corrected by the error correction countermeasure
   wherein the instruction is a DMA data transfer instruction.

4. The method as claimed in claim 1, further comprising associating an attribute with the instruction or the data, the attribute indicating whether the error correction countermeasure should be used when executing the instruction or the data.

5. The method of claim 4, further comprising propagating the attribute along with the instruction or the data to a selected component if it is determined that the error correction countermeasure should not be used and the error correction countermeasure is disabled.

6. The method as claimed in claim 1, wherein the range of addresses is specified by one or more registers.

7. A method of processing instructions and data, comprising:
   determining whether an error correction countermeasure should be used in association with an instruction or data to correct an error of the instruction or data; and
   disabling the use of the error correction countermeasure based on the determination, so that if the error correction countermeasure is disabled, then the error of the instruction or data will not be corrected by the error correction countermeasure;
   wherein the determination of whether the error correction countermeasure should be used is performed in a memory management unit by checking an attribute table while performing address translation.

8. A method of processing instructions and data, comprising:
   determining whether an error correction countermeasure should be used in association with an instruction or data to correct an error of the instruction or data; and
   disabling the use of the error correction countermeasure based on the determination, so that if the error correction countermeasure is disabled, then the error of the instruction or data will not be corrected by the error correction countermeasure;
   wherein the instruction or the data has an attribute indicating whether the error correction countermeasure should be used when executing the instruction or processing the data, and the attribute is included in a transaction packet for transmitting the instruction or the data to a device.

9. A method of processing instructions and data,
   determining whether an error correction countermeasure should be used in association with an instruction or data to correct an error of the instruction or data; and
   disabling the use of the error correction countermeasure based on the determination, so that if the error correction countermeasure is disabled, then the error of the instruction or data will not be corrected by the error correction countermeasure;
   wherein determining whether the error correction countermeasure should be used includes identifying multiple error correction countermeasures and selecting one or more of the multiple error correction countermeasures for disabling.

10. A processor for processing instructions and data, comprising:
    means for analyzing an instruction or the data to determine whether an error correction countermeasure should be used in association with the instruction or the data to correct an error of the instruction or data; and
    means for disabling the error correction countermeasure based upon the determination, so that if the error correction countermeasure is disabled, then the error of the instruction or data will not be corrected by the error correction countermeasure.

11. The processor as claimed in claim 10, wherein the instruction is a data transfer operation.

12. The processor as claimed in claim 10, wherein an attribute is associated with the instruction or the data, the attribute indicating whether the error correction countermeasure should be used when executing the instruction or the data.

13. The processor as claimed in claim 10, further comprising one or more registers specifying a range of addresses, at least a portion of the address range being utilized when the error correction countermeasure is disabled.

14. The processor as claimed in claim 10, further comprising a memory management unit that checks an attribute table while performing address translation to determine whether the error correction countermeasure should be used with the instruction or the data.

15. A system capable of processing error correction countermeasures associated with instructions and data, the system comprising:
    a processor including:
      means for analyzing a selected instruction or selected data to determine whether any error correction countermeasures should be used in association with the selected instruction or the selected data to correct an error of the selected instruction or the selected data,
      means for enabling or disabling at least one of the error correction countermeasures in accordance with the determination, if the means for determining determines that the selected instruction or the selected data should be executed by the processor, so that if the at least one of the error correction countermeasures is disabled, then the error of the selected instruction or data will not be corrected by the at least one of the error correction countermeasures, and
    means for propagating the selected instruction or the selected data; and
    a device operable to receive the selected instruction or the selected data from the propagating means.

16. The system as claimed in claim 15, wherein the device is a cache memory.

17. The system as claimed in claim 15, wherein the device is a storage buffer.

18. The system as claimed in claim 15, wherein the device is a local memory internal to the processor.

19. The system as claimed in claim 15, wherein the device is an I/O device.

20. The system as claimed in claim 15, further comprising an attribute indicating whether one or more of the error correction countermeasures should be used.

21. The system as claimed in claim 20, wherein the propagating means attaches the attribute to a transaction packet containing the selected instruction or the selected data for transmission to the device.

22. The system as claimed in claim 15, wherein the analyzing means checks whether an address associated with the selected instruction or the selected data is within a range of addresses.

23. The system as claimed in claim 15, wherein the analyzing means includes at least one register.

24. The system as claimed in claim 15, wherein the analyzing means includes a memory management unit that checks an attribute table while performing address translation.

25. A method of processing instructions, comprising:
    obtaining an address associated with an instruction issued by a processor;
    determining whether the address is within a predetermined range of addresses in a memory; and
    disabling any error correction countermeasures when the address is within the predetermined range so that if the error correction countermeasures within the predetermined range are disabled, then any error within the predetermined range will not be corrected by the error correction countermeasures.

26. The method of claim 25, wherein the instruction issued by the processor comprises data transfer operation.

27. The method of claim 25, wherein the determination step includes accessing information from a hardware register that is indicative of the predetermined range.

28. The method of claim 27, wherein the information includes at least one of a starting address of the predetermined range, a length of the predetermined range, and an ending address of the predetermined range.

29. A method of processing instructions, comprising:
    obtaining an address from a data transfer command issued by a processor;
    accessing an address translation table to determine a physical address in a memory that is associated with the address of the data transfer command;
    accessing an attribute table to obtain an error correction attribute that is associated with at least one of the address of the data transfer command and the physical address; and
    disabling at least one error correction countermeasure when the associated attribute so indicates;
    wherein if the at least one error correction countermeasure is disabled, then any error associated with the at least one of the address of the data transfer command and the physical address will not be corrected by the error correction countermeasure.

30. A processing system for processing instructions, comprising:
    a plurality of processing devices operable to issue instructions, execute instructions, or both issue and execute instructions, a first one of the processing devices comprising a processing unit or a subprocessing unit;
    wherein the first of the processing devices is programmed to determine whether an error correction countermeasure should be used in association with a selected instruction to correct an error of the instruction, and to disable the use of the error correction countermeasure based on the determination so that if the error correction countermeasure is disabled, then the error of the instruction will not be corrected.

31. The processing system of claim 30, wherein the first of the processing devices issues the selected instruction, and the selected instruction is a data transfer operation.

32. The processing system of claim 30, wherein the first of the processing devices is integrated with a processing element that comprises the processing unit and one or more subprocessing units connected via a bus.

33. The processing system of claim 32, wherein the first of the processing devices comprises the processing element.

34. The processing system of claim 32, wherein an attribute is associated with the selected instruction, the attribute indicating whether the error correction countermeasure should not be used, and the selected instruction is propagated along with the attribute between the subprocessing element and the processing unit via the bus.

35. The processing system of claim 34, wherein the attribute is attached to a transaction packet, and the transaction packet includes the selected instruction.

36. The processing system of claim 30, wherein the first of the processing devices determines whether the error correction countermeasure should be used by checking whether an address associated with the selected instruction is within a selected range of addresses.

37. The processing system of claim 30, further comprising a memory management unit connected to the first of the processing devices, the memory management unit including an attribute table, wherein the determination of whether the error correction countermeasure should be used includes examining the attribute table while performing address translation.

38. The processing system of claim 30, wherein:
    a second one of the processing devices comprises a processing unit;
    the first of the processing devices comprises a first subprocessing unit; and
    at least a third one of the processing devices comprises a second subprocessing unit, the first and second subprocessing units being connected to the processing unit by a bus, and at least the first subprocessing unit being connected to a memory.

39. A processor for processing instructions, comprising:
    a processing element including a bus, a processing unit and a plurality of subprocessing units connected to the processing unit by the bus, the processor being connectable to a memory and being operable to issue instructions, execute instructions, or both issue and execute instructions;
    wherein the processor is programmed to determine whether an error correction countermeasure should be used in association with a selected instruction to correct an error of the instruction, and to disable the use of the error correction countermeasure based on the determination so that if the error correction countermeasure is disabled, then the error of the instruction will not be corrected.

40. The processor of claim 39, wherein the processing element, the processing unit or one of the sub processing units issues the selected instruction, and the selected instruction is a data transfer operation.

41. The processor of claim 39, wherein an attribute is associated with the selected instruction, the attribute indicating whether the error correction countermeasure should not be used, and the selected instruction and the attribute are propagated by the processor as part of a transaction packet.

42. The processor of claim 39, wherein the processor determines whether the error correction countermeasure should be used by checking whether an address associated with the selected instruction is within a selected range of addresses.

43. The processor of claim 39, further comprising a memory management unit, the memory management unit including an attribute table, wherein the determination of whether the error correction countermeasure should be used includes examining the attribute table while performing address translation.

44. A computer processing system, comprising:
a user input device;
a display interface for attachment of a display device; and
a processor comprising one or more processing elements, at least one of the processing elements being programmed to issue instructions, to execute instructions, to determine whether an error correction countermeasure should be used in association with a selected instruction to correct an error of the selected instruction, and to disable the use of the error correction countermeasure based on the determination so that if the error correction countermeasure is disabled, then the error of the instruction will not be corrected.

45. A computer network, comprising:
a plurality of computer processing systems connected to one another via a communications network, each of the computer processing systems comprising:
a user input device;
a display interface for attachment of a display device; and
a processor comprising one or more processing elements, at least one of the processing elements being programmed to issue instructions, to execute instructions, to determine whether an error correction countermeasure should be used in association with a selected instruction to correct an error of the selected instruction, and to disable the use of the error correction countermeasure based on the determination so that if the error correction countermeasure is disabled, then the error of the selected instruction will not be corrected.

46. The computer network of claim 45, wherein at least one of the computer processing systems comprises a gaming unit capable of processing multimedia gaming applications.

47. A system comprising:
a plurality of processors configured to execute processor tasks;
an execution unit for managing a reallocation of the processor tasks among the plurality of processors; and
a detecting unit for detecting an attribute of a selected one of the processor tasks;
wherein the execution unit reallocates the processor tasks depending upon the attribute of the selected processor task, the attribute is assigned based upon a data type, and the data type indicates whether a data error or defect is noticeable to a user, and
wherein if the data error or defect is not noticeable to a user, then the data error or defect will not be corrected.

48. The system of claim 47, wherein the data type further indicates whether data is real time data.

49. The system of claim 47, wherein the data type further indicates whether data is streaming data.

50. The system of claim 47, wherein the reallocation further depends upon detecting an error occurrence in one of the plurality of processors.

51. The system of claim 50, wherein the execution unit reallocates the processor tasks by evaluating the attribute of the selected processor task prior to the detection of the error occurrence.

52. The system of claim 47, wherein each of the processors includes a local memory.

53. The system of claim 47, wherein each of the processors comprises a plurality of processing devices.

54. The system of claim 53, wherein the plurality of processing devices include a first type of processing device and a second type of processing device.

55. A method of processing instructions, comprising:
determining an initial allocation of processor tasks among multiple processors;
detecting an attribute associated with a selected one of the processor tasks; and
reallocating the processor tasks based upon the attribute of the selected processor task;
wherein the attribute is assigned based upon a data type which indicates whether a data error or defect is noticeable to a user, and if the data error or defect is not noticeable to a user, then the data error or defect will not be corrected.

* * * * *

UNITED STATES PATENT AND TRADEMARK OFFICE
CERTIFICATE OF CORRECTION

PATENT NO.       : 7,689,814 B2
APPLICATION NO.  : 11/016797
DATED            : March 30, 2010
INVENTOR(S)      : Yasukichi Okawa Page 1 of 1

It is certified that error appears in the above-identified patent and that said Letters Patent is hereby corrected as shown below:

Col. 6, Line 49, "units are disposed" should read -- units disposed --.
Col. 7, Line 48, "retain-data" should read -- retain data --.
Col. 12, Line 9, "receives" should read -- receive --.
Col. 12, Line 67, "employ its own" should read -- employ their own --.
Col. 13, Line 13, "processing unit 112B" should read -- processing units 112B --.
Col. 15, Line 57, "words are needed" should read -- words is needed --.
Col. 16, Line 45, "400. And" should read -- 400 and --.
Col. 17, Line 2, "then" should read -- than --.
Col. 17, Line 26, "processors is avoided" should read -- processors are avoided --.
Col. 17, Line 27, "facilitates" should read -- facilitate --.
Col. 18, Line 29, "whether an" should read -- whether one --.
Col. 21, Claim 26, Line 34, "comprises data" should read -- comprises a data --.

Signed and Sealed this
Twelfth Day of April, 2011

David J. Kappos
*Director of the United States Patent and Trademark Office*